July 27, 1965   L. J. BISHOP ETAL   3,196,805
LOAD BEARING TROLLEY AND TROLLEY ACCUMULATION MECHANISM
Filed Oct. 28, 1960   12 Sheets-Sheet 2
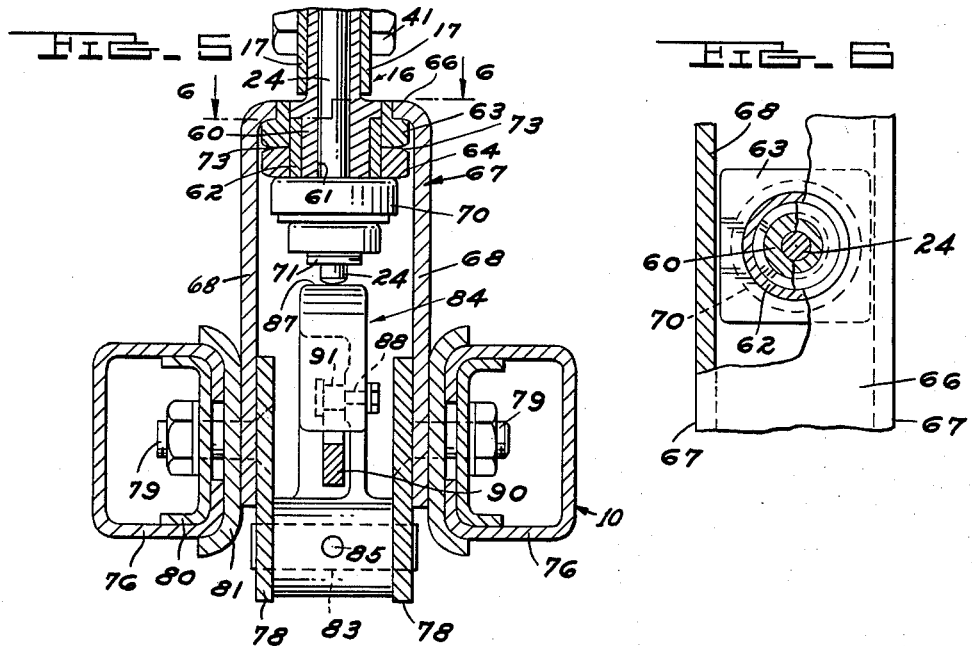
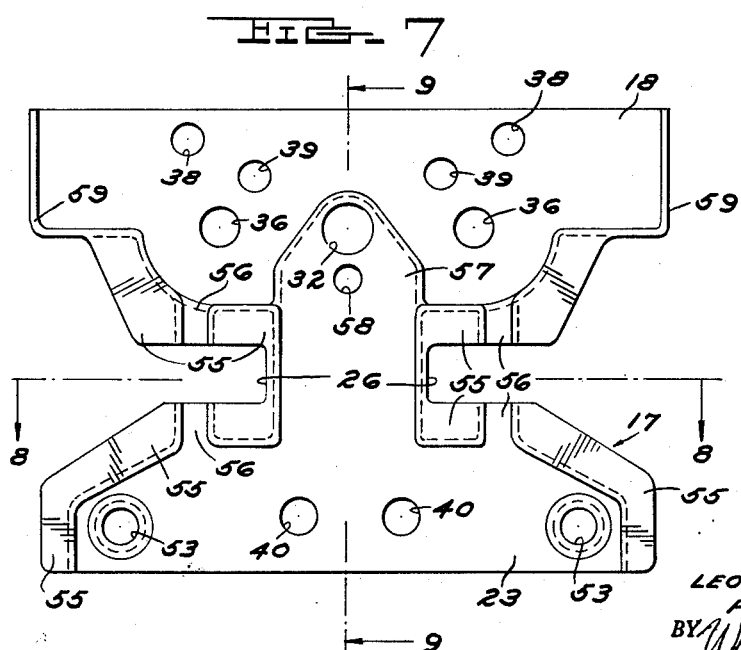
INVENTORS
LEONARD J. BISHOP
PAUL KLAMP
BY Whittemore, Hulbert &
Belknap
ATTORNEYS July 27, 1965    L. J. BISHOP ETAL    3,196,805
LOAD BEARING TROLLEY AND TROLLEY ACCUMULATION MECHANISM
Filed Oct. 28, 1960    12 Sheets-Sheet 3
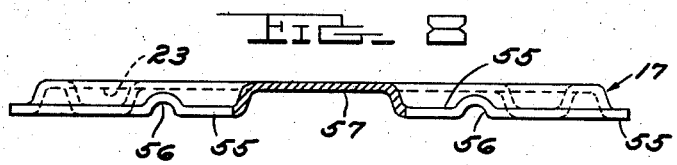
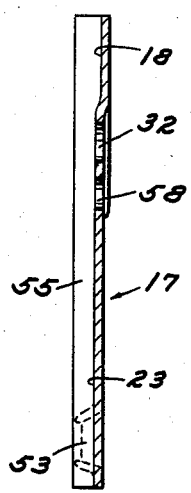
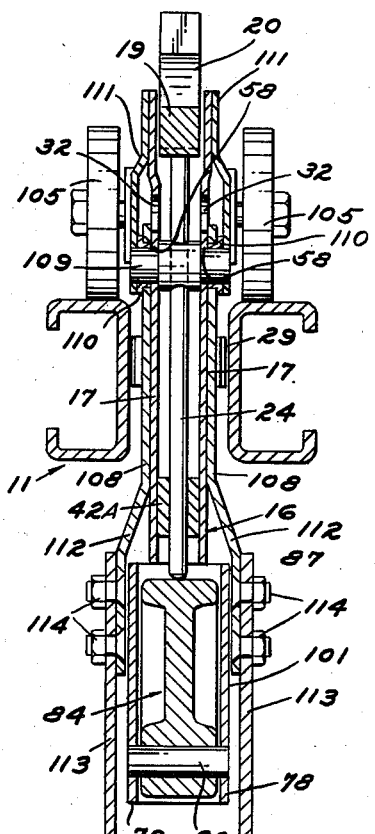
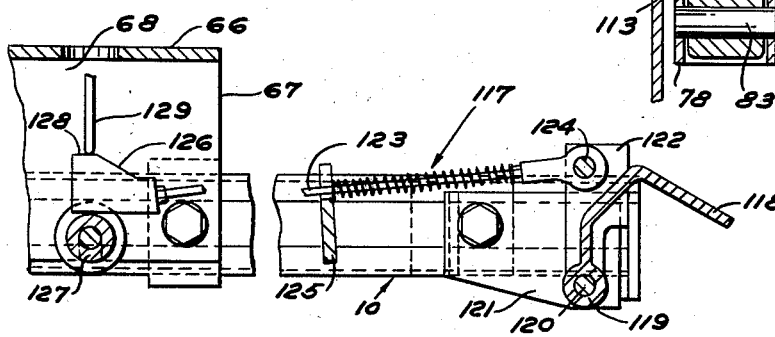
INVENTORS
LEONARD J. BISHOP
PAUL KLAMP
BY Whittemore Hulbert &
Belknap
ATTORNEYS

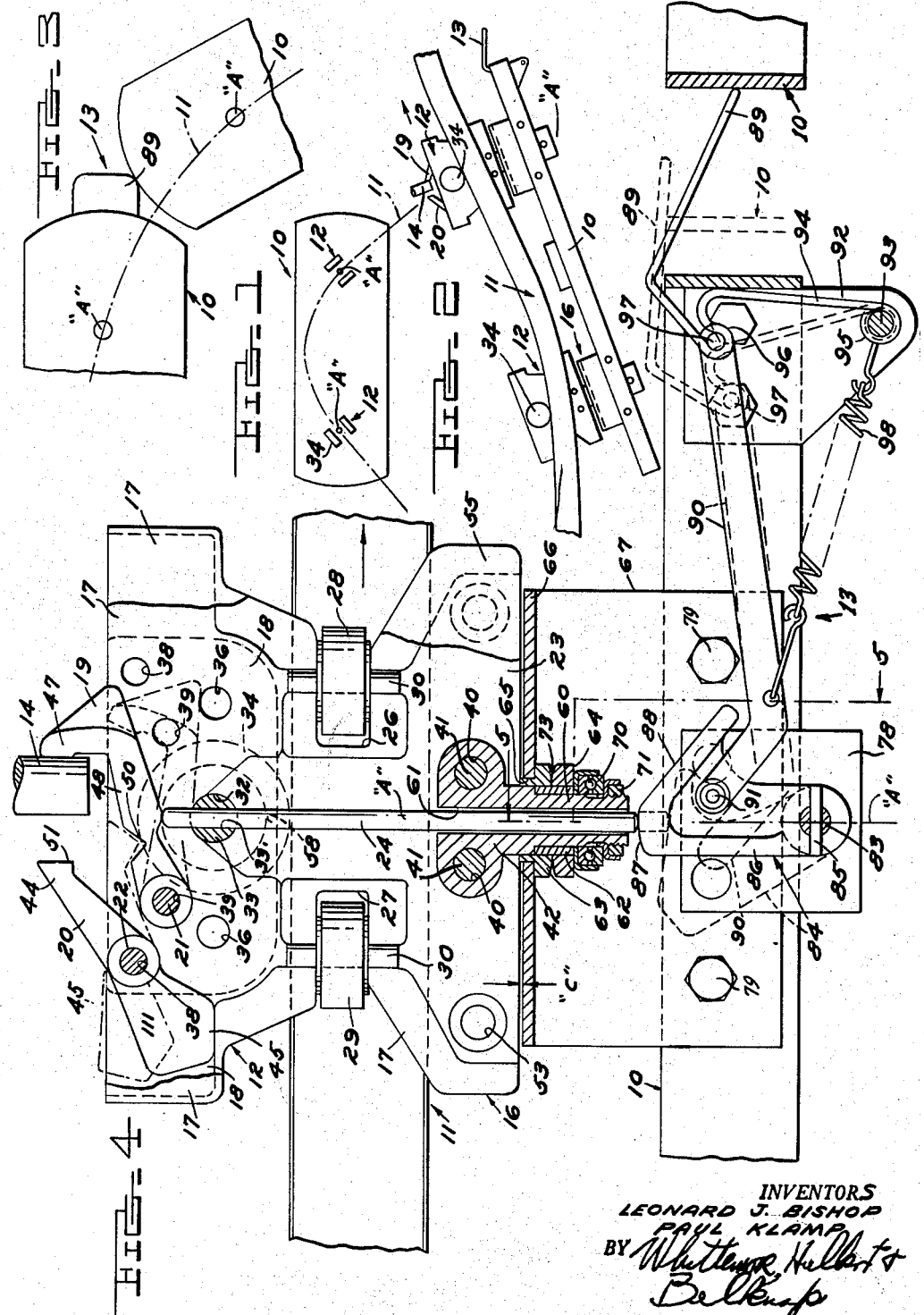

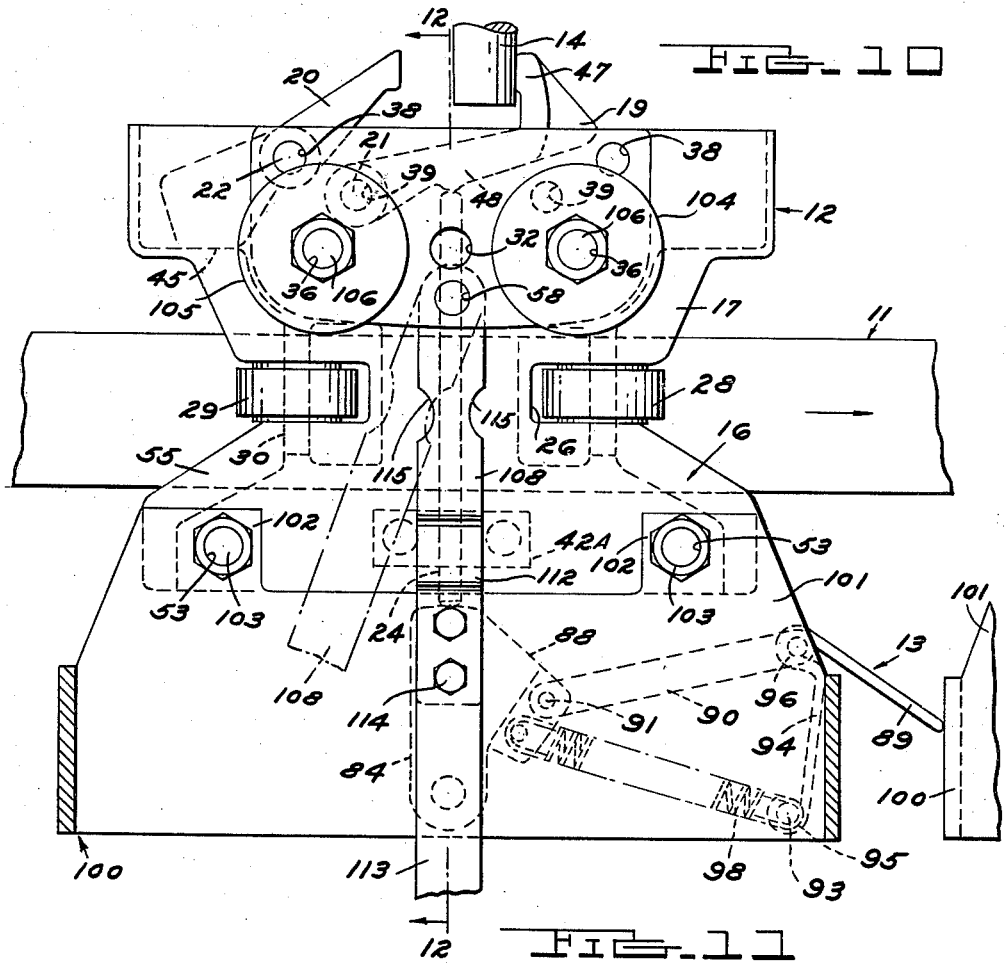
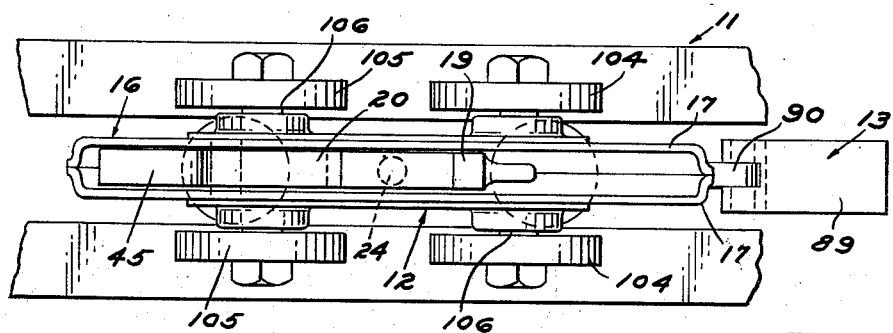

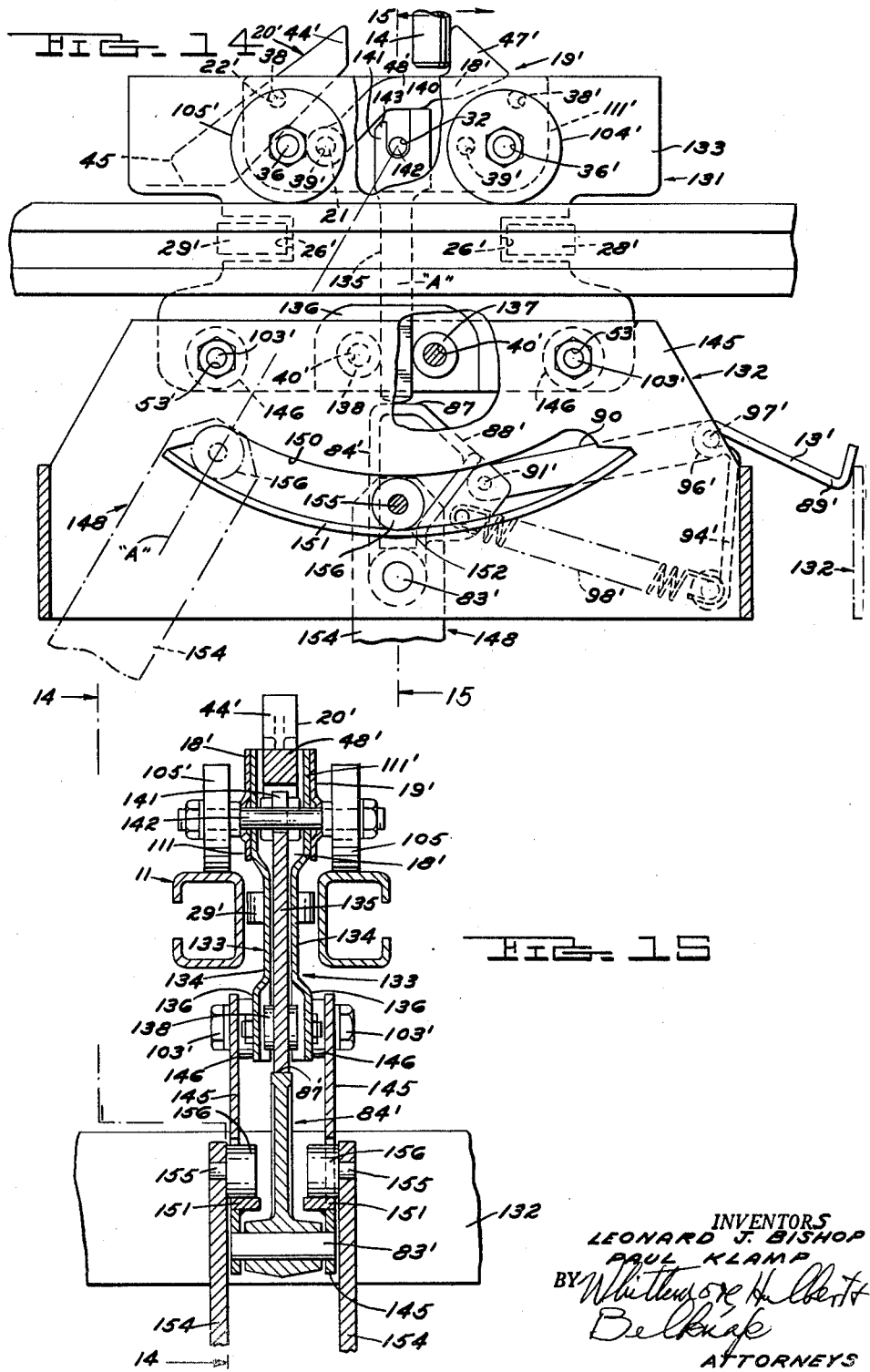

July 27, 1965     L. J. BISHOP ETAL     3,196,805
LOAD BEARING TROLLEY AND TROLLEY ACCUMULATION MECHANISM
Filed Oct. 28, 1960     12 Sheets-Sheet 6
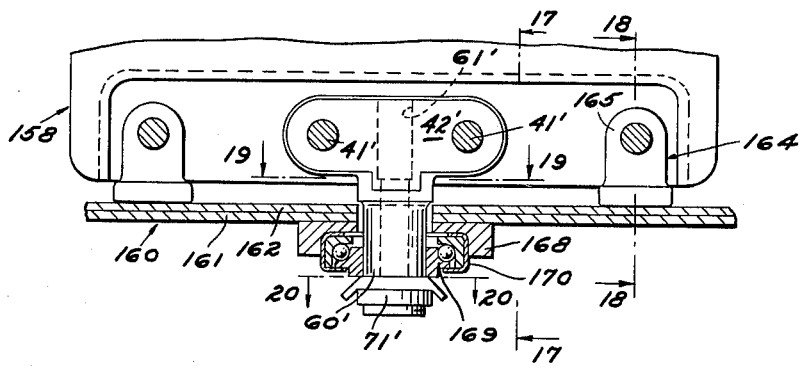
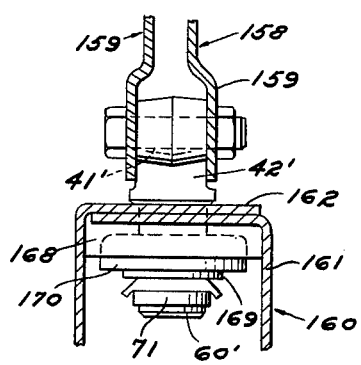
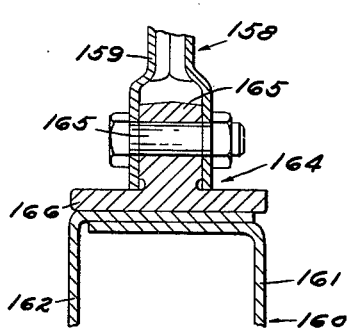
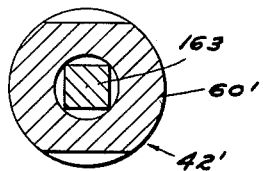
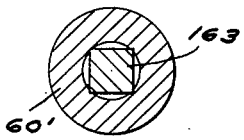
INVENTORS
LEONARD J. BISHOP
PAUL KLAMA
BY
ATTORNEYS

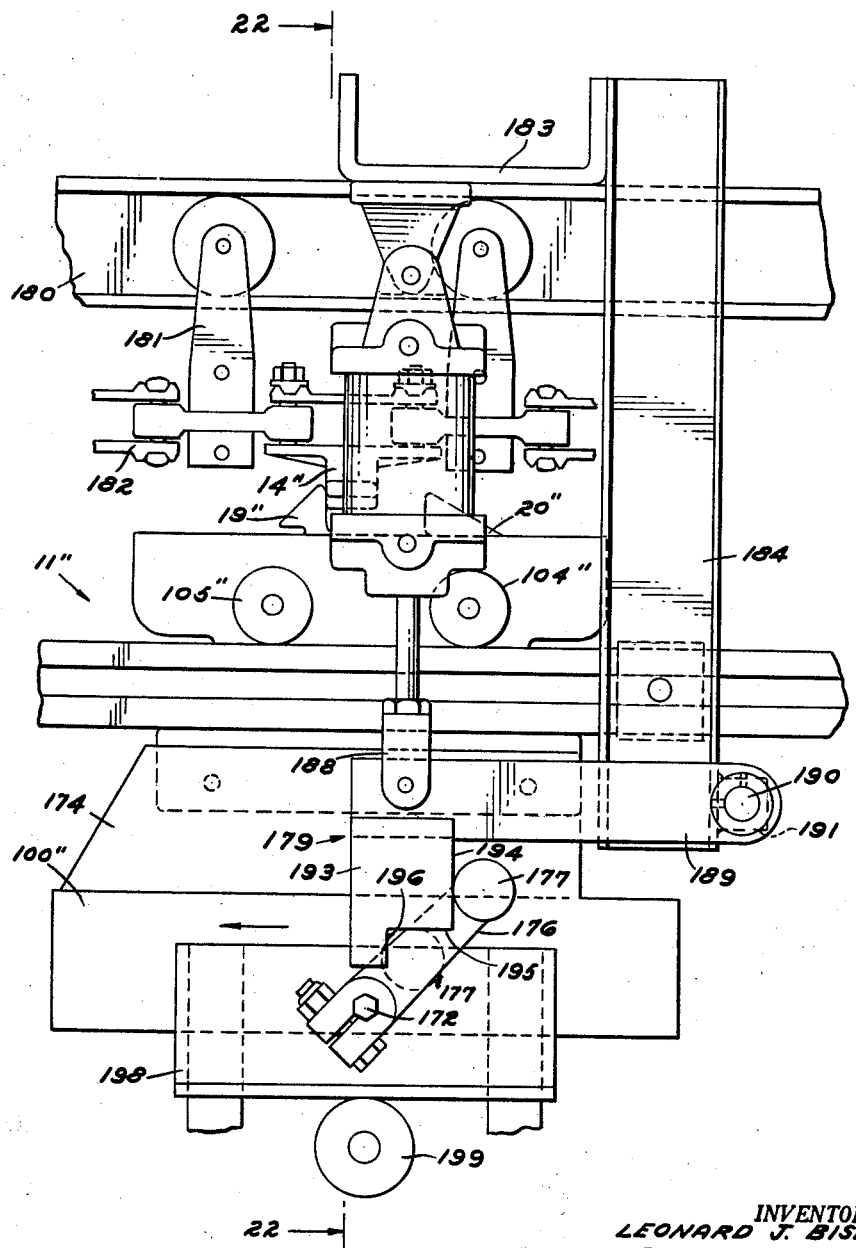

INVENTORS
LEONARD J. BISHOP
PAUL KLAMP
BY Whittemore Hulbert
Belknap
ATTORNEYS

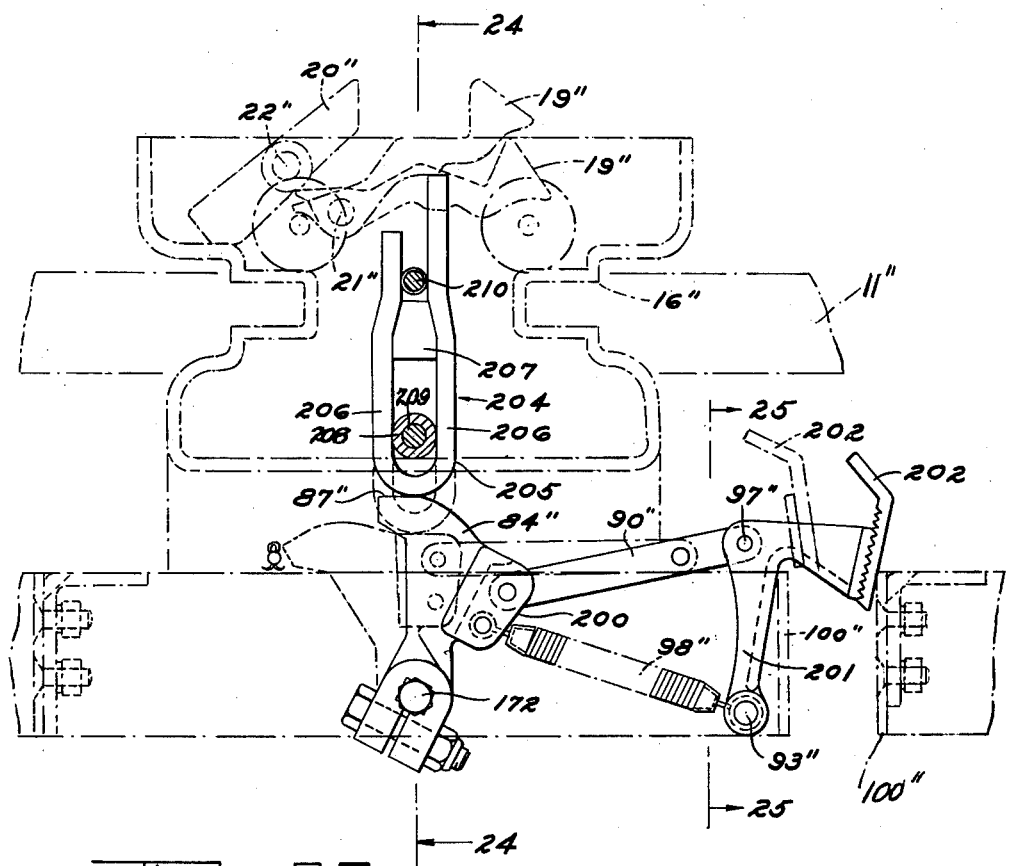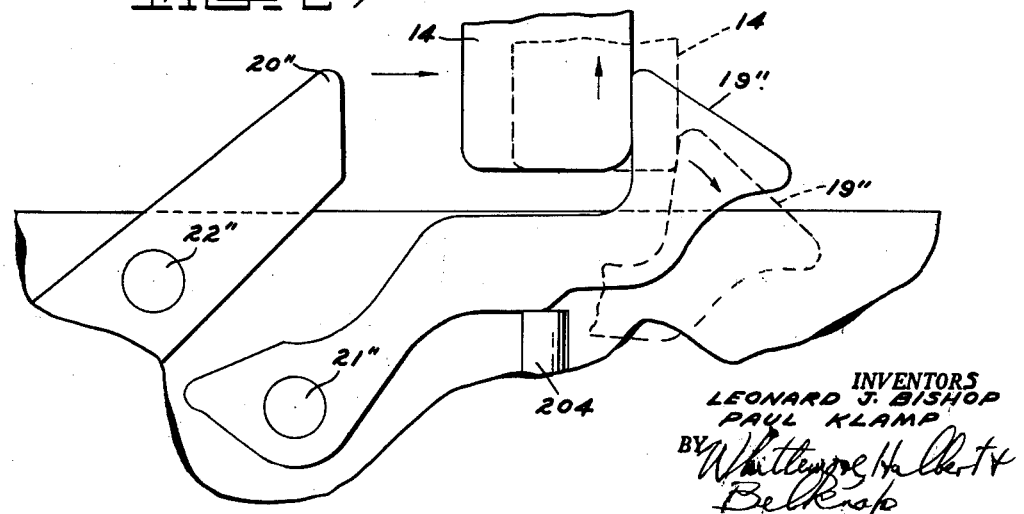

July 27, 1965  L. J. BISHOP ETAL  3,196,805
LOAD BEARING TROLLEY AND TROLLEY ACCUMULATION MECHANISM
Filed Oct. 28, 1960  12 Sheets-Sheet 10
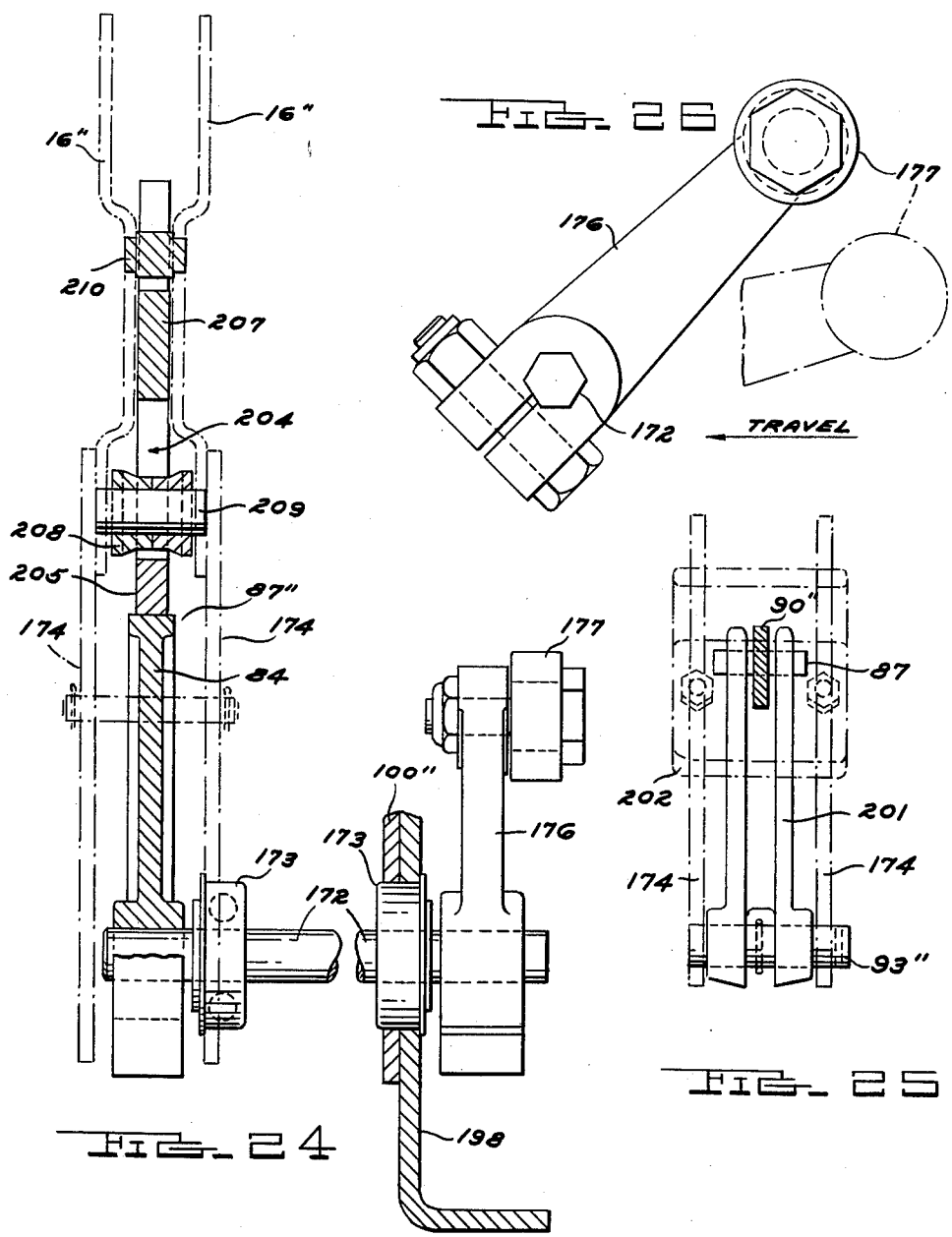
INVENTORS
LEONARD J. BISHOP
PAUL KLAMP
BY
ATTORNEYS

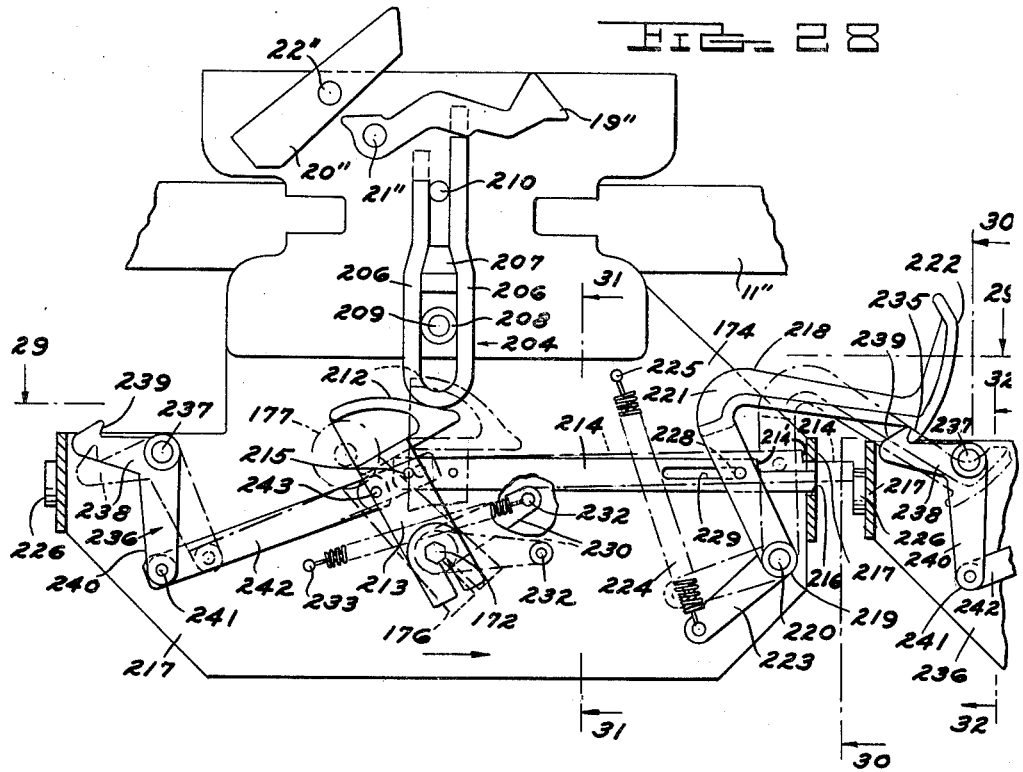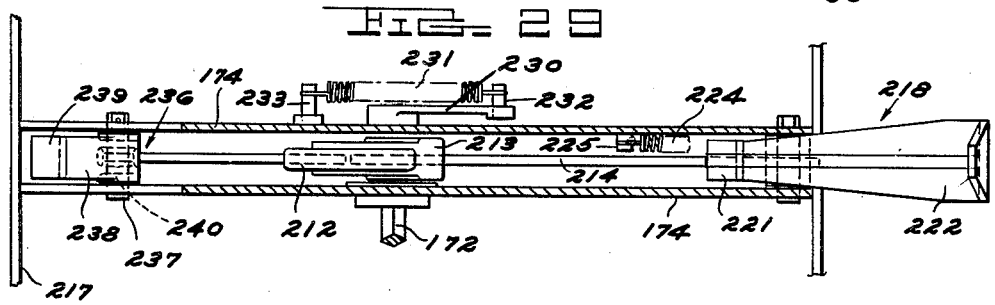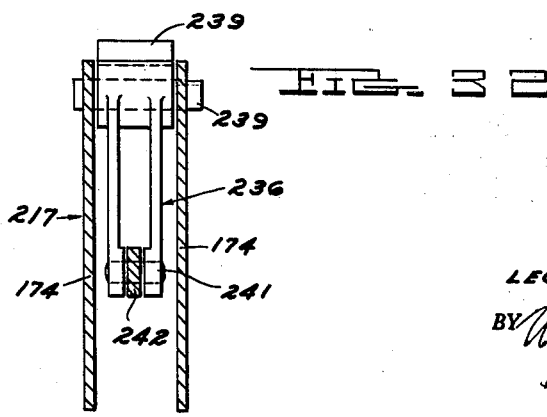

July 27, 1965 L. J. BISHOP ETAL 3,196,805
LOAD BEARING TROLLEY AND TROLLEY ACCUMULATION MECHANISM
Filed Oct. 28, 1960 12 Sheets-Sheet 12

INVENTOR.
LEONARD J. BISHOP
PAUL KLAMP
BY Whittemore, Hulbert &
Belknap
ATTORNEYS

United States Patent Office

3,196,805
Patented July 27, 1965

3,196,805
LOAD BEARING TROLLEY AND TROLLEY
ACCUMULATION MECHANISM
Leonard J. Bishop, Birmingham, and Paul Klamp, St.
Clair Shores, Mich., assignors to Mechanical Handling
Systems, Inc., Detroit, Mich., a corporation of Michigan
Filed Oct. 28, 1960, Ser. No. 65,674
60 Claims. (Cl. 104—172)

The present invention relates to improvements in a load bearing trolley of the type commonly used in industrial overhead conveyor systems, and to an improved trolley accumulation mechanism, whereby a series of two or more trolleys may be halted and accumulated at a suitable station along the conveyor path, then released as desired for further movement along that path. The expressions "accumulation mechanism," "accumulation unit," "accumulation control" mechanism or unit, and the like are hereinafter employed optionally to designate a mechanism or unit which controls such accumulation and release of such trolleys at the accumulation station in question.

It is an object of the invention to provide an overhead trolley structure which is improved, in that, without any significant change in the composition of its body-forming parts, it may be readily adapted to either a two wheel type of suspension from an overhead track (featuring a pair of wheels journaled on a common axis or axle) or a four wheel type (featuring two pairs of forward and rear wheels traveling the track, with the load suspended from a point between the wheel axes). In accordance with this object, the body is fabricated of standard, like sheet metal stampings which are punched or otherwise formed to provide appropriate axle-mounting openings, as well as provisions for pivotally mounting on the body the dogs through the agency of which the trolley is engaged by an overhead power chain to forward the same along the conveyor path.

More specifically, it is an object to provide a trolley structure of this sort fabricated of like sheet metal stampings which may be assembled by welding the same to one another, and in which there are provided axle mounting openings for the selective reception of either a single pair of track wheels on an axis passing through the transverse center of the trolley body, or for the reception of two pairs of trolley wheels in openings extending through the trolley body forwardly and rearwardly of the openings which receive the dual wheel arrangement, thereby enabling the same trolley body to be employed for both the two wheel or four wheel type suspension.

In further accordance with the invention, the body stampings are provided with duplicate pairs of transverse openings through the plates constituting the same, which are optionally available for the pivotal mounting of forward and rearward trolley dogs. Since the invention as it deals with the trolley accumulation mechanism involves the use of trolley dogs which are pivoted on the trolley body in non-symmetric offset relationship to the vertical center thereof, it is seen that the provision of duplicate dog mounting openings on duplicate trolley body stampings represents a very desirable standardization in production, without requiring any alteration in the basic trolley body design.

A further object is to provide a trolley accumulation mechanism for a load supporting trolley and bumper unit characterized by load bumpers which, regardless of whether the trolley is a two wheel or four wheel type, depend from the trolley beneath the overhead track upon which it rolls, these bumpers each being provided with an improved accumulation control linkage, whereby upon engagement of the linkage of one bumper with a bumper trolley of said one bumper is instantaneously dropped out of position in which it is drivingly engaged by an overhead power chain lug or dog.

In accordance with this object, the accumulation mechanism includes a forwardly extending bumper tongue pivotally mounted on the bumper and adapted to be predeterminedly swung upon engaging the bumper of a similar trolley bumper assembly preceding the same. The bumper element is operatively connected through a suitable linkage and cam device with a pin or rod mounted for vertical sliding movement on the trolley; and this pin supports from beneath the forward trolley dog referred to above. Thus upon downward movement of the pin, the support for the dog in question is removed and it falls out of propelling relationship to the power chain lug. In accordance with the invention, the propelling dog is so pivoted on the trolley body that it swings forwardly and downwardly out of such propelling relationship, in the forward direction of movement of the chain dog, thus not resisting the disengagement or tending to impart a reverse force to the chain dog or lug in disengaging.

A still further object of the invention is to provide a trolley and trolley accumulation mechanism having provision whereby to enable a swiveling of the load about a vertical axis relative to the trolley body, for example, when the trolley passes around a track curve. The invention, with this in mind, contemplates the provision of a vertically movable dog supporting pin or rod, releasable in relation to the dog to permit its disengagement as described, which is guided for its vertical movement on an upright line through the swiveling axis of the load support. Thus the pin always maintains a predetermined position vertically beneath the dog whose release it controls, so that horizontal swinging of the load on the trolley in traversing the curve is of no effect insofar as the continued control of the propelling dog is concerned.

A further object is to provide an improved trolley and accumulation mechanism as described, featuring a release pin or rod and provisions to selectively move the same along a vertical line through the swiveling axis of the trolley load, preferably as governed by a control tongue or bumper element on the load bumper, which can be employed whether the trolley is a two wheel or a four wheel type.

Yet another object is to provide a trolley structure of this sort having improved means for the antifriction swiveling of the load to pivot about the upright axis of the control rod or pin, in which means are provided to receive impact shock adjacent the swivel connection without stressing the latter in a damaging way. To this end, the swivel connection has associated therewith an improved "outrigger" feature permitting a slight rocking action at the swivel bearing. Thus it is possible to provide a stable journaling of the swivel parts in a very compact way, and without resorting to bearing provisions spaced considerably, in the vertical longitudinal sense, from one another along the line of the vertical movable control rod or pin.

A still further object is to provide an improved trolley structure which, in the event a two wheel support is employed, enables the control rod or pin to pass through the axis of the two track wheels; and in which the load is hanger-supported for swinging action externally of the trolley body in the event four wheels are employed, thus leaving room for the control rod to act vertically in the space in the body between the forward or rearward wheels.

Another object is to provide an improved trolley and bumper assembly featuring trolley body structure similar to that described above which, as applied to a four-wheel trolley arrangement in which the trolley is rigidly secured to the bumper, has the accumulation control rod acting vertically between the forward and rearward track wheels of the trolley, but in which the load hanger is suspended in a novel manner from the bumper itself.

More specifically, in accordance with this object, the bumper is suspended by hanger means from a rigid connection to the trolley body, and has arcuate ways formed in the sides of the suspending portion of the bumper, in which the load hanger is suspended.

Further, in accordance with this object, the load hanger suspension is effected through the agency of a roller adapted to longitudinally travel the arcuate way, with the hanger pivoted on the axle or journal of such roller. The arrangement is such that when the hanger suspending roller is in a normal or neutral position during horizontal travel of the trolley-bumper assembly, the suspended roller is in the center of the upwardly concave arcuate way, with its axis on a vertical line through that of the control rod and the longitudinal center line of the trolley between its forward and rearward track roller axes. Thus, as the trolley ascends or descends a track incline, the line of hanger suspension remains vertical and through said longitudinal trolley center line, with no tendency to cause up-ending of the trolley in either direction.

Yet another object is to provide a trolley-bumper structure in which, due to the suspension of the load hanger on the bumper itself, the accumulation control rod may be increased in dimension for added rigidity, and may be made rectangular in cross section for better guidance between the trolley body stampings, the invention contemplating the guiding of the lower rod between forward and rearward anti-friction rollers. In general accordance with this same object, the load hanger may be better guided for swinging movement, without tendency to twist, by reason of its suspension from the bumper in the manner referred to above.

A still further specific object is to provide an improved swiveled load trolley structure, as an alternative of the so-called outrigger type described above, characterized by improved means for containing rocking action at the swivel, in the form of anti-friction bearing feet between the trolley and load carrier at opposite sides of the swivel.

In accordance with a still further embodiment of the invention, it is an object to provide an accumulation control type trolley having improved provisions for automatically disengaging the same from a propelling dog of a continuously traveling power chain, in which this action is responsive to contact of a stop mechanism on the trolley with a releasable stop adjacent its track, as distinguished from bumper abutting engagement with a preceding trolley load carrier. In accordance with this improvement the dog disengaging control rod responding to the control mechanism in question, and preferably along a vertical axis central of the front and rear of the trolley as in the previous embodiment, may also be coupled with further means as referred to above for automatically disengaging the trolley and power chain dog by bumper impact with a preceding trolley. However, it is also contemplated that the automatic stop-controlled mechanism may be incorporated in the trolley without such bumper control feature.

More specifically, the cam which controls action of a vertically acting control or dog release rod, similar to the rod operated under bumper motivation alone in the other forms, has mechanically coupled thereto, at one side of the trolley's bumper or load support, a lever engageable with a releasable stop positioned adjacent the trolley free track, so that impact of such arm or lever with the stop automatically disengages the trolley dog from the continuously traveling power chain dog. This takes place prior to any possible releasing actuation of the control rod by the bumper impact-responsive linkage or means of the trolley.

The improvements of the invention, in particular reference to the bumper operated provisions for decoupling a trolley from an overhead propelling power chain, on a line of action coinciding with the swiveling axis of a trolley supported load, have been found to perform admirably within an intermediate range of conditions determined by trolley speed and load weight considerations. This is the range in which the momentum of a load bumper impacting a preceding bumper is sufficient to operate the trolley decoupling linkage fully, withdrawing the forward propelled dog of the trolley fully out of position for driving engagement by a pusher dog of a power chain; and in which the momentum is not sufficiently great to cause an undesired rebound of the impacting bumper from the preceding bumper. In the range of lower speed or low momentum conditions of operation and higher speed or higher momentum conditions, it may be found desirable to make further provisions insuring reliable operation under any condition encountered.

Therefore, it is a further object of the invention to provide a bumper or impact actuated decoupling linkage for a trolley in which, should the impact momentum be insufficient (as by reason of slow speed operation) to cause the bumper tongue to ride up fully over the rear of the impacted bumper, the decoupling action will nevertheless proceed to completion, just as in the operation of the system at a higher load speed.

It is a further object to provide improvements of the modified sort just described which may be combined with the control of the trolley by a movable track stop engaged by the bumper, in addition to the bumper tongue-responsive means.

A still further object, in accordance with the embodiment just referred to, is to provide, as another improvement employed in an installation designed for high trolley speed or high momentum operation, by reason of which possible excessive and undesired rebound of the load and trolley after impact with a preceding load is prevented. As an additional feature, the action of this improvement has the effect of resetting the control provisions of the bumper struck from the rear.

The foregoing as well as other objects will become more apparent as this description proceeds, especially when considered in connection with the accompanying drawings illustrating the invention, wherein:

FIG. 1 is a schematic plan view illustrating the manner in which the invention enables a pair of forward and rearward trolleys of the two wheels type to transport a longitudinally extended load bumper about a relatively abrupt curve, for example, of an arc indicated in dot-dash line in the figure, permitting relative swiveling of the bumper and trolleys about vertical axes in so traveling;

FIG. 2 is a fragmentary schematic view in elevation showing the action of such trolleys, the forward one being propelled by a power chain lug, in ascending a track rise, with the load suspended from the bumper at a point longitudinally intermediate the two bumpers;

FIG. 3 is a fragmentary schematic plan view illustrating the action of the accumulation feature of the invention in accumulating a succession of trolleys, for example at a track curve;

FIG. 4 is a fragmentary view in side elevation, partially broken away and in vertical longitudinal section, showing features of the invention as applied to a two wheel trolley to control the accumulation of trolleys at a predetermined point along an overhead conveyor track;

FIG. 5 is a fragmentary view in transverse vertical section along broken line 5—5 of FIG. 4;

FIG. 6 is a fragmentary plan view, partially broken away and in section along line 6—6 of FIG. 5 to show load swiveling and dog control provisions of the invention;

FIG. 7 is a side elevational view from the inner side of one of two stamped trolley body components of the improved trolley;

FIGS. 8 and 9 are, respectively, views in horizontal and vertical cross section along lines 8—8 and 9—9 of FIG. 7;

FIG. 10 is a fragmentary view in side elevation, partially broken away and in vertical longitudinal section, showing the invention as applied to a four wheel trolley;

FIG. 11 is a top plan view of the trolley and track arrangements of FIG. 10;

FIG. 12 is a view in transverse vertical section along line 12—12 of FIG. 10;

FIG. 13 is a fragmentary view in vertical longitudinal section to a load bumper and trolley accumulation mechanism in accordance with a modified embodiment of the invention.

Figure 22:
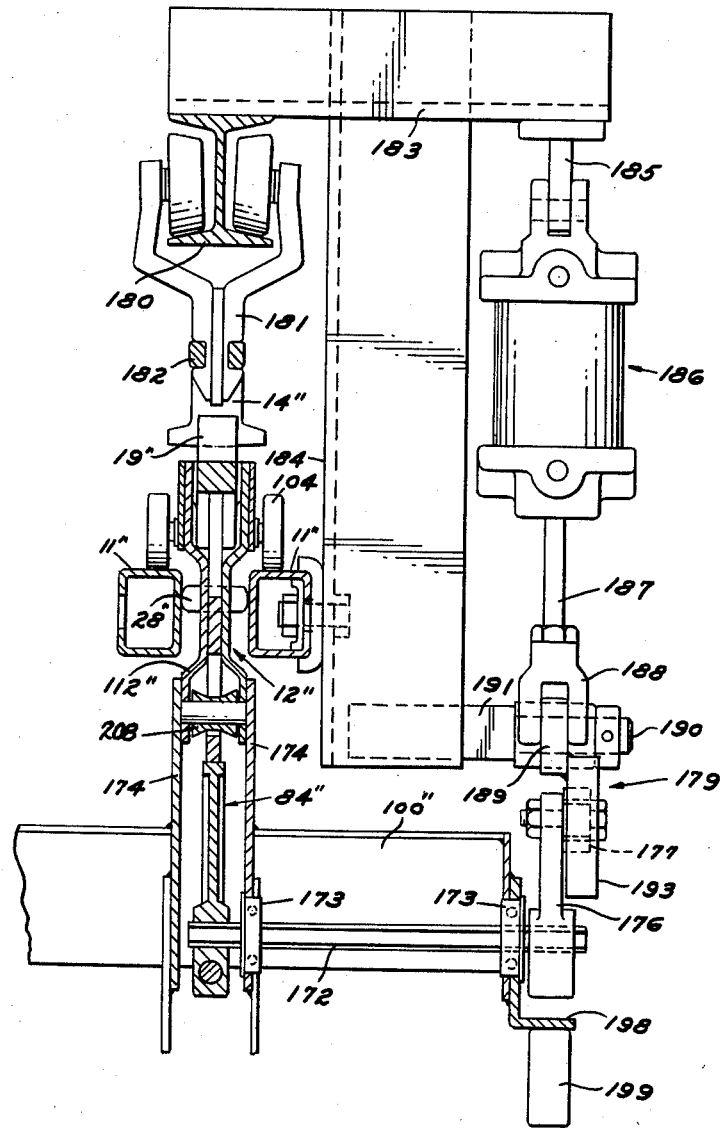
Figure 33:
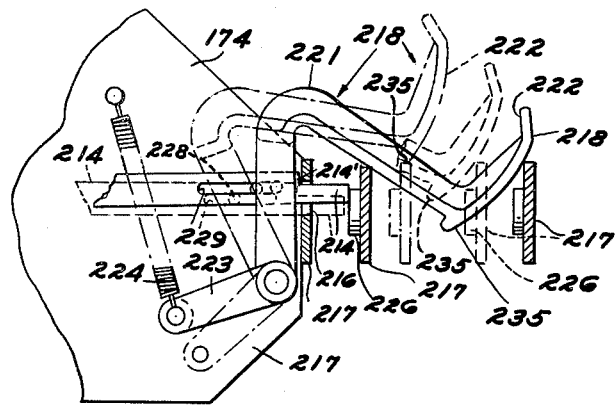
Figures 30, 31:
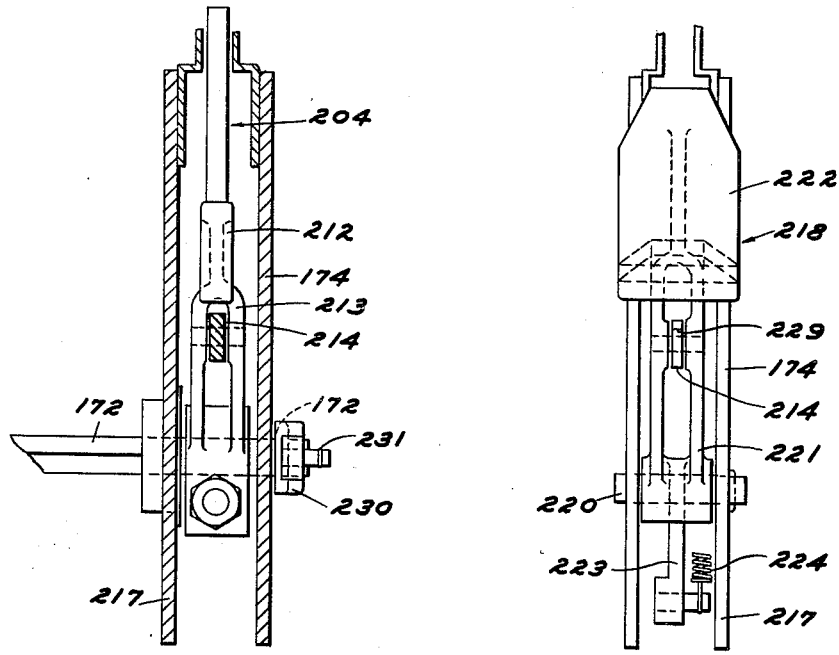

FIG. 14 is a fragmentary view, partially broken away, in central longitudinal and vertical section similar to FIGS. 4 and 10, of a further modified embodiment of the trolley and bumper accumulation assembly;

FIG. 15 is a view in transverse vertical section along line 15—15 of FIG. 14;

FIG. 16 is a fragmentary view in section similar to FIG. 4, illustrating an alternative form of swivel connection between the trolley and load carrier bumper body, featuring a modified type of rock-limiting feature in substitution for the outrigger feature of the arrangement of FIG. 4;

FIGS. 17 and 18 are, respectively, fragmentary views in transverse vertical section on lines 17—17 and 18—18 of FIG. 16;

FIGS. 19 and 20 are views in horizontal section respectively along lines 19—19 and 20—20 of FIG. 16;

FIG. 21 is a fragmentary end elevational view showing a further embodiment of the invention in which the trolley, in addition to bumper-responsive release means (or, if desired, in substitution for the latter), is equipped with means responsive to engagement with a fixed but releasable track stop to decouple the trolley from driving engagement by the overhead power chain, structural details of the trolley body proper being similar to those shown in other figures, hence more or less schematically shown;

FIG. 22 is an end elevational view of this embodiment, as from the left of FIG. 21, being partially sectioned along line 22—22 of FIG. 21;

FIG. 23 is an elevational view showing bumper and stop actuated components of this embodiment, a side plate of the load carrier being omitted, features of the trolley proper being again more or less schematically shown, and to a considerable extent in dotted line;

FIGS. 24 and 25 are, respectively, view in vertical section along line 24—24 and 25—25 of FIG. 23;

FIG. 26 is a view in side elevation, as viewed from the right of FIG. 24, of the stop-actuated arm or lever of the embodiment referred to;

FIG. 27 is a fragmentary, side elevational view illustrating a condition which may arise in the operation of a controlled accumulation trolley at a relatively low speed or under relatively low load momentum, such as might not arise when a greater load or momentum is involved, as to which condition a further modified embodiment of the invention affords the solution;

FIG. 28 is a view in longitudinal vertical section through a somewhat schematically shown trolley and load bumper unit, showing in solid and dotted lines the relative positions of parts operating under the low speed range conditions mentioned above, as well as in a range exceeding the intermediate, this view also showing in dot-dash line optional provisions for the control of the trolley decoupling action by a selectively operable track-mounted stop, in the manner illustrated in connection with FIGS. 21 through 26;

FIG. 29 is a view in horizontal section along line 29—29 of FIG. 28;

FIGS. 30, 31 and 32 are views in vertical section, respectively, along line 30—30, 31—31 and 32—32 of FIG. 28; and FIG. 33 is a view in section similar to FIG. 28, illustrating the action in the accumulation decoupling of a load trolley having a low speed or momentum.

Referring to schematic FIGS. 1, 2 and 3, FIGS. 1 and 2 illustrate the principles of the invention as applied to the propulsion of a load supporting bumper 10 of elongated rectangular outline along an overhead track 11, using a air of longitudinally spaced trolleys, generally designated 12, which are of the two wheel type in accordance with the invention. FIG. 1 demonstrates the relative swiveling action of the trolleys 12 and bumper 10 about a vertical axis or axes as the load rounds a curve in track 11; while FIG. 2 shows the action in ascending a rise in the track. FIG. 3 depicts the operation of the trolley accumulation mechanism of the invention, which is generally designated by the reference numeral 13. In FIG. 2, and in other of the figures to be described, the reference numeral 14 designates a traveling propelling dog or lug carried by an overhead power chain (not shown), also appropriately trolley-supported and guided by provisions of an entirely conventional nature, with which the present invention does not deal.

It is seen by reference to FIG. 1 that when an elongated load support, represented by the bumper 10, is employed, it may be desirable to use trolleys of the two-wheel type, thereby necessitating a relative swiveling action of the bumper 10 and trolleys 12 in rounding a curve in track 11. However, in view of the fact that the accumulation mechanism 13 has its mount on the bumper, it is also desirable in the interest of simplicity and reliability that its action, involving a release of the trolleys from propelling engagement by the chain dog 14, be maintained in an unvarying line on the upright swiveling axis of the trolley. This axis will therefore be located at the vertical line A passing normal to the axis of the repsective wheels of trolleys 12. Provision for placing the line of action of the accumulation control at the swiveling axis of the bumper-trolley assembly is therefore one of the important features of the present invention. It will be appreciated that, regardless of whether the loads are to be accumulated at a straight line part of the track 11, or at a curve therein (as illustrated in FIG. 3) the action line is undisturbed by the swivel component.

In a load supporting arrangement such as that of FIG. 2, employing two trolleys of the two-wheel type, the load will be supported from the bumper 10 at a point intermediate the forward and readward trolleys 12 to swing freely. In the event that the trolley is of the four-wheel type, the load will preferably be suspended in the manner illustrated in FIGS. 10, 11 and 12 of the drawings, enabling the line of action of the accumulation assembly to remain unchanged from its position in the two-wheel trolley, so that the identical type of accumulation mechanism may be employed on either the two- or the four-wheel type trolley. Regardless of whether the bumper 10 is supported by dual trolleys (as in FIGS. 1 and 2) or by a single trolley (as in FIGS. 4, 5 and 6) the provisions for its swiveling mount on the trolley, and its accumulation mechanism, are as illustrated in the last named figures.

The reference numeral 16 in FIG. 4 designates a two-part trolley body which is constituted in the manner to be explained in detail in connection with FIGS. 7, 8 and 9, the parts being shaped sheet metal stampings 17 of identical outline and cross section in all respects, so that these two parts may be assembled in mating relation to one another and welded together along meeting edges to form the body 16, in the manner to be described.

As thus assembled, the body is characterized by a hollow-interior formation including an upwardly opening, longitudinally elongated space 18 in which forward and rearward trolley dogs 19, 20, respectively, are pivoted on the respective transverse pins 21, 22; a somewhat similarly shaped, downwardly opening space 23 for the reception of certain means to effect a swivel connection of trolley 12 to the bumper 10, as well as a vertically acting accumulation control rod 24, to be described; and the body stampings 17 are longitudinally recessed inwardly at the forwardly and rearwardly facing ends thereof to provide body recesses 26, 27. Forward and rearward guide rollers 28, 29, respectively, are disposed in these recesses, being journaled on fixed upright pins 30 clamped between the two mated and welded stampings 17.

The stampings 17 are punched or otherwise formed adjacent the upper portion thereof to provide aligned circular holes 32 opening therethrough at the longitudinal vertical center of the troller, for the reception of an axle pin 33; and load bearing track rollers 34 are journaled on this pin, on opposite outer sides of the trolley body 16, for rolling engagement with the top of the track 11. It will be appreciated by those skilled in the art that the forward and rearward guide rollers 28, 29 travel in the space between vertical webs of the track 11.

The stampings 17 are also provided, in equally spaced relation to the front and rear of the opening 32, with further circular openings in transverse alignment through the same, these openings being designated 36, and being for the reception of the pivots or axles of pairs of forward and rearward load-bearing track rollers or wheels, in the event the trolley body 16 is employed in a four-wheel installation, rather than the two-wheel type shown in FIGS. 4, 5 and 6.

Control rod 24 slides vertically in a central upright hole 33' in the axle pin 33.

Furthermore, the body stampings 17 are provided with pairs of circular apertures 38 opening therethrough for the selective reception of pivot pins such as the pivot pins 22 of the rear trolley dog 20; and they are provided with other pairs of openings 39 for the reception of pivot pins 21 for the forward dog 19, it being noted that the pivot pins 21, 22 are located on the same longitudinal side of the vertical center line of the trolley. Duplicate sets of pin receiving openings 38, 39 enable the identical stampings 17 to be mated and welded, with the pivot pins 22, 21, respectively, disposed in either set of the pin receiving apertures.

Adjacent the lower portion thereof, the stampings are provided with pairs of transversely aligned circular openings 40 for the reception of a pair of studs or bolts 41, by which a swivel yoke body or fitting 42 is mounted to the trolley body 16 in the downwardly opening space 23 of the latter.

As shown in FIG. 4, the rear trolley dog 20 is of a known type, including a forwardly and upwardly facing pusher nose 44 and a weighted rear counterbalancing tail 45, by which it is urged counterclockwise to the operative, solid line position of FIG. 4. It is adapted to be depressed forwardly and downwardly by a power chain pusher dog 14 overtaking the trolley 12 from the rear.

The forward trolley dog 19 is formed in a generally L-shaped outline, to provide an upwardly extending pusher nose 47, against which dog 14 acts, and a downwardly and rearwardly inclined arm 48, the rear end of which is pivoted to trolley body 16 by pin 21 in upwardly opening space 18 of the latter, in the manner described. As thus pivoted, the weight of the forward dog 19 and its elongated moment arm are sufficient to cause the same to drop clockwise out of position for prepelling engagement by the dog 14, when dog 19 is not sustained upwardly by the accumulation control pin or rod 24. In order to enable the rear trolley dog 20 to depress far enough (to the dotted line position of FIG. 4) when it is swung forward by the chain dog 14, arm 48 of the forward dog 19 is provided with a suitable side recess 50, into which the pointed nose extension 51 of rear dog 20 may be received.

Finally, in order to enable the trolley 12 to be associated in a fixed relation to the load bumper 10, as when a four wheel trolley is to be employed, the body stampings are provided with pairs of transversely aligned circular recesses 53 opening therethrough, and a connection of the bumper to the trolley is made at these recesses, in the manner described in connection with FIGS. 10, 11 and 12 of the drawings.

Reference may be had to FIGS. 7, 8 and 9 for a clearer showing of one of the stampings 17 from which the trolley body 16 is constituted, whether used in a two wheel or a four wheel construction. It is seen that each stamping is embossed to provide, in a central horizontal web portion 55 thereof, pairs of vertically aligned recesses 56 of semi-circular cross section (FIG. 8), in which the pivot pins 30 for the forward and rearward, vertically journaled guide rollers 28, 29 are received. Within these web portions, the stamping provides an inwardly opening recess 57 extending upwardly from the downwardly opening recess 23. It is in the recess portion 57 that the accumulation control rod 24 acts vertically; and the holes 32 which receive the journal pin or axle 33 of the two-wheel trolley are also located in the recess portion 57. For the purpose of suspending a load hanger when the trolley is employed as a four wheel one, the stampings 17 are further provided with aligned circular openings 58 opening therethrough directly beneath the wheel axle opening 32.

With two of the stampings 17 mounted in face-to-face relation to one another, they are secured and constituted a unitary trolley body by welding, as at the web zones 55, and at edge portions 59 adjacent the top thereof at which they have edge-meeting engagement.

As thus constituted in accordance with the invention, the trolley 12 is extremely compact, simple and inexpensive in construction, capable of manufacture by mass production techniques. While intended for use in association with an accumulation mechanism, as will be further described hereinafter, in which only one set of the dog pivot pins 21, 22 will be employed on the same side of the central vertical line of the trolley, it will be appreciated that the stamped construction of the trolley as shown in FIGS. 5, 6, 7, 8 and 9 may also be employed in a more conventional type of dog arrangement, i.e., with both forward and rearward dogs pivoted in the opposed pairs of recesses 38. The advantages of the trolley body construction in permitting the use of two wheel or four wheel features have been mentioned above, and its further advantages in regard to the action of the accumulation control rod or pin 24 vertically on the axis of swiveling motion of the two wheel unit, in accordance with FIGS. 4, 5 and 6, will now be further enlarged on.

The swiveling yoke member 42, as rigidly coupled between the trolley body stampings 17 by the studs or bolts 41, has a tubular downward extension 60 providing a vertical bore 61 within which control rod 24 acts with sufficient side clearance to prevent binding. The extension 60 is rotatably journaled in a sleeve bushing 62 which is carried within a pair of opposed upper and lower rocker members 63, 64, respectively, which are of square outline. The upper rocker member 63 has a press fit at 65 in a central aperture in the upper horizontal web portion 66 of a sheet metal saddle 67 of inverted U-shape outline (see FIGS. 5 and 6). The downwardly extending flanges 68 of this saddle are only sufficiently elongated in the vertical sense to receive and mount the portions of the accumulation control mechanism (to be described). It will be noted that, as shown in FIGS. 5 and 6, the flanges 68 are closely adjacent opposed sides of the square bushing-mounting members 63, 64, and thus prevent rotation of those members about the axis of the bore 61.

A suitable end thrust ball bearing 70 is fitted axially on the lower end of the tubular coupling extension 60, being taken up by a threaded retainer ring 71 on the extension to hold the parts in place, with the saddle 67 capable of swiveling horizontally relative to the coupling member 42 and trolley 12 at the bearing represented by bushing 62, and with end thrust of the load taken by the ball bearing 70.

It will be noted by reference to FIG. 4 that, as thus mounted, the web 66 of saddle 67 has a slight vertical clearance, represented by the reference character "C," between the same and the lower edge extremity of the trolley body 16. It will also be noted that the bushing mounting members 63, 64 are mildly crowned or rounded at axially engaging surfaces 73 thereof. Thus, a slight forward and rearward rocking action in the direction of the length of the saddle 67 and the bumper 10, to which its flanges 68 are secured, is permitted at the crown surfaces 73. Yet this motion is limited in extent, being only sufficient to prevent undue shock when bumper motion is halted or under a similar stress, by engagement of the top of the saddle web 66 with the bottom of trolley body 16.

The significance of this resides in the fact that the swiveling provisions are extremely compact in the vertical sense, fitting into a limited vertical dimension within the saddle 67, as clearly shown in FIG. 4, yet giving all needed stability at the swivel pivot. It will be appreciated that equal stability could be otherwise achieved only by spacing a pair of rotative bearings in a substantially spaced relationship to one another along the swiveling axis; but this would consume an undue axial length and would thus bring the pumper 10, to which the trolley accumulation mechanism is mounted, unduly beneath the trolley itself.

As shown in FIGS. 4, 5 and 6, the accumulation mechanism, of which the vertically acting control rod or pin 24 is a part, is generally designated by the reference numeral 13. FIG. 5 shows the bumper 10 as being constituted by a pair of frame members 76 brought inwardly to parallelism with one another along the outer sides of the saddle flanges 68, and secured to the latter by bolts or studs 79 (FIG. 4). Again referring to FIG. 5, the saddle flanges 68 further support a pair of mounting plates 78 in depending relation to the inner flange sides. Plates 78 may be secured to the bumper frame members 76 by the bolts or studs 79, with clamping and spacer pieces 80, 81 interposed between the respective flanges and bumper parts, in the manner indicated in FIG. 5, thereby locking the saddle 67 tightly to the bumper 10.

At a point beneath the saddle the mounting plates 78 have a transverse pin 83 journaled therein, and a control cam 84 is fixed on the pin 83, as by a transverse locking pin 85. Cam 84 is in the form of an arm 86 which, in the operative condition of the accumulation mechanism 13 in which it sustains the trolley dog 19 (solid line in FIG. 4), extends upwardly in the line of the swiveling axis "A" of the trolley and bumper assembly. In this position an upper abutment surface 87 of cam 84 underlies the control rod 24 and holds it upwardly. However, when cam 84 is swung counterclockwise (FIG. 4) from its solid line to its dotted line position, the rod or pin 24 rides downwardly along an inclined cam surface 88 thereof, allowing rod 24 and the dog 19 to drop from their solid line to their dotted line position.

This takes place when the bumper control tongue 89 of the accumulation mechanism 13 of one bumper 10 engages the rear of a preceding bumper and is thus shifted from its solid line position of FIG. 4 to its dotted line position. To this end, the mechanism 13 comprises an elongated, angled operating link 90 which has one end thereof pivotally connected at 91 to the arm 86 of cam 84, the link 90 extending forwardly of the bumper frame members 76, and the angling thereof permitting clearance relative to the studs or bolts 77 forwardly of the saddle 67.

The bumper 10 has a depending bracket 92 suitably secured thereto adjacent its front, and medially of its transverse dimension. A pivot pin 93 extends transversely of this bracket and pivotally mounts the control tongue 89 of the accumulation mechanism 13. To this end, the tongue 89 is provided with a downwardly extending arm portion 94 shaped in an eye at 95 to encircle the pin 93 and thus pivotally mount the tongue 89 on the latter as an axis. The arm 94 is further formed intermediate the length of the same to provide a further eye portion at 96, at which it may encircle a pin 97 on the forward end of operating link 90, thereby operatively connecting the tongue 89 with that link. A coiled tension spring 98 acts between the rod or pin 93 as a fixed anchor and an intermediate portion of the link 90 to urge the latter forwardly, or to the right as viewed in FIG. 4.

As thus forwardly urged, the tongue 89 will be in its solid line position of FIG. 4, further clockwise movement about the axis at 93 being prevented by engagement of the tongue arm 94 with the forward portion of bumper 10.

Thus, as the tongue 89 strikes the rear of a bumper in advance thereof, halting movement of the bumper on which it is mounted, it swings from the solid line position to the dotted line position of FIG. 4, shifting link 90 to the rear and causing cam surface 88 to slide to the left and counterclockwise beneath the lower end of control rod 24. The latter thus falls downwardly, dropping the forward, chain-propelled dog 19 from its solid to its dotted line position. In so dropping, it has a forward component of swing, taking it away forwardly from the chain-driven dog 14, rather than a swing in the reverse sense tending to oppose motion of the dog, and thus adding to the force driving the trolley forwardly. Normally, upon movement of the tongue 89 to the dotted line position of FIG. 4, it will overlie the rear portion of the bumper 10 in advance thereof, so that the dog 19 will remain depressed. However, should the bumper rebound, restoring the dog to its elevated position under the force of spring 98, the next approaching chain lug 14 will, with a lesser degree of force or impetus, reengage the tongue 89 and swing it to the dotted line position, disengaging the trolley from the driving chain.

It is desirable that the tongue 89 be of substantial transverse dimension, as illustrated in FIG. 3, so that the foregoing trolley releasing and accumulating action may take place, regardless of whether the trolleys are accumulating at a bend in the conveyor track 11. It is also seen from this figure, that the line of action of the accumulation control rod 24 is always vertically upwardly along axis "A" on the center of swiveling movement of the bumper 10 and its hanger relative to the trolley body 16, being exactly the same whether accumulation takes place on a straightaway or on a curve. This is extremely important when trolleys of the two-wheel type in accordance with the invention are employed, with horizontal swiveling taking place along the vertical center line of the trolley structure.

An alternative embodiment of the principles of the invention in a four-wheel type trolley is illustrated in FIGS. 10, 11 and 12 of the drawings. As indicated above, structural features of the trolley body 16 are identical to those illustrated in FIGS. 4, 5, and 6, so that corresponding numerals are employed to designate corresponding parts and relationships, and further description thereof will be dispensed with. The same applies to the trolley dogs 19, 20, and their action under the control of a mechanism 13 for accumulation such as is shown in the previous figures.

In this embodiment, the bumper, specially designated by the reference numeral 100, is rigidly attached to the trolley 12, and to this end has a pair of laterally spaced parallel upright mounting plates 101 providing end extensions or ears 102 which are adapted to be secured to the trolley 16 by bolts or studs 103 passing through the holes 53 in the lower portion of the trolley. The bumper is thus, in effect, constituted a rigid and unitary part of the trolley. As illustrated in FIG. 10, trolley track wheels 104, 105 are journaled in forward and rearward pairs, respectively, on axles 106 received in the trolley body holes 36. The control pin 24 of the accumulation mechanism may act upwardly through a mounting member or fitting 42A corresponding to the fitting 42 of FIG. 4, but without need for the swiveling provisions illustrated and described in FIG. 4.

In a four wheel trolley of this type, the load is centrally suspended to hang downwardly within the outline of bumper 100 from a pivot point located centrally between the axles 106 of the forward and rearward track wheels or rollers 104, 105, respectively. Therefore due to the presence of the pin 24 and its guide means at 42A, the invention contemplates the use of hanger straps 108 which pass downwardly on the outer sides of trolley body 16.

To this end, and as best illustrated in FIG. 12, a pivot pin 109 is disposed in the transversely aligned openings 58 of the body stampings 17, and the hanger straps 108 are provided adjacent their top with bushings 110 surrounding reduced diameter ends of pin 109 outwardly of the openings 58. Auxiliary mounting plates or side pieces 111 are welded or otherwise fixedly secured to the outer sides of the stampings 17, adjacent the top of the latter, and are apertured to receive the outer ends of the pin 109, as the latter thus journals the straps 108 on the bushings 110. The bushings 110 are end-restrained by the auxiliary side pieces 111, which are apertured to fit over the outer ends of pivot pin 109 and hold the bushings in place. As in the embodiment of FIGS. 4–6, the control rod 24 is guided adjacent its top in a cross bore in pin 109. It is seen from FIG. 12 that pin 109 is made of increased diameter at its midpoint to receive and guide control rod 24 adjacent the top of the latter; and in the two wheel embodiment of FIGS. 4–6 it is also desirable to increase the diameter of the wheel axle pin 33 in order to permit its cross boring and still leave adequate material in the pin.

Hangers 108 are spread relative to one another at 112 to pass about the sides of the plates 78 which provide mounting for the accumulation control cam 84, and have the upper ends of load supporting bars 113 secured thereto, as by bolts 114. The hangers 108 may have edge recesses 115 formed therein (FIG. 10) to afford added space for swing in relation to the between-track guide rollers 28, 29.

FIG. 13 of the drawings illustrates a modified embodiment of an automatic accumulation mechanism, generally designated by the reference numeral 117 and schematically shown as applied to a bumper 10 of the general character of the bumper shown in FIGS. 4, 5 and 6. This mechanism has a forward operating tongue 118 adapted for engagement with a bumper ahead of the same, the tongue being provided with a hub 119 swingable about a cross pin 120 on a bracket 121 bolted or otherwise secured to bumper 10 centrally of its width. An upright actuating arm 122 is suitably secured on the hub 119 and has one end of a rearwardly extending operating link 123 pivotally mounted thereon at 124.

The link 123 extends through an upwardly opening slot in a fixed cross piece 125 on the bumper 10, and has fixed on its end a cam member 126. This cam has a flat bottom surface which is guided for longitudinal movement by a flanged guide roller 127 suitably journaled in the bumper 10, or in the saddle 67 thereof. Cam 126 has a flat rear top surface 128 upon which a control rod or pin 129 normally rests, the function of the pin being the same as that of the pin 24 of the earlier embodiment of the accumulation mechanism. An inclined cam surface is also formed on the top of cam 126 forwardly of surface 128; and it will be seen that, as the control or operating tongue 118 engages the rear of a preceding bumper, it will be swung counterclockwise about its pivot at 120, causing link 123 and cam 126 to be moved rearwardly, and thus dropping the control rod 129 to disengage the forward trolley dog (not shown in FIG. 13) from driving engagement by the power chain dog (not shown). In all other respects, features of the trolley with which the accumulation mechanism 117 is associated will be in accordance with what has been described above in connection with either FIGS. 4, 5 and 6 or FIGS. 10, 11 and 12.

FIGS. 14 and 15 illustrate an alternative embodiment of trolley and bumper features which are specially well suited for application to a four-wheel trolley, although, as before, they are also well suited to a two-wheel trolley. Here, the trolley is generally designated by the reference numeral 131, since it differs in some respects from the trolley 12 described above. However, it is similar to the trolley 12 in respect to its provisions for journaling track wheels and axles and trolley dogs, and for the suspension of a bumper generally designated 132 from the trolley. Accordingly, such features and relationships as are possessed in common by trolley 131 and bumper 132 and the corresponding other four-wheel embodiment of FIGS. 10, 11 and 12 are designated in FIGS. 14 and 15 by corresponding reference numerals, primed, and further description and discussion thereof will be dispensed with.

It is seen by reference to FIG. 15 that the trolley 131 is constituted by a pair of body stampings 133 which, as in the earlier embodiment, are identical, but feature intermediate web portions 134 between the forward and rearward guide roller receiving recesses 26' which are flat and parallel, and laterally spaced from one another only sufficiently to receive therebetween with adequate working clearance the accumulation control rod or pin 135. This pin is, in the embodiment under consideration, rectangular in cross section, its sides paralleling the adjacent walls of webs 134.

As in the earlier embodiment, the body stampings 133 are spread outwardly adjacent their upper ends to provide the upwardly opening space 18' in which the forward and rearward trolley dogs 19' and 20' are received and pivoted. At the lower portions thereof the stampings 133 are embossed outwardly at 136 in the longitudinal central zone only thereof, as indicated in FIG. 14, for the reception of the swivel coupling member 42 when the trolley is a two-wheel one. Such member is, however, not employed in the four-wheel trolley but is replaced by a pair of forward and rearward anti-friction guide rollers 137, 138, respectively, between which the forward and rearward flat sides of the control rod 135 are guided. The lower end of the control rod 135 rests on a cam 84' similar to that of the embodiments of FIGS. 4–6 and 10–12, and similarly actuated by accumulation control tongue and linkage means.

The upper end of control rod 135 is formed to provide forked fingers 140, 141 which upwardly straddle a fixed guide pin 142 received in the aligned openings 32' of body stampings 133, thus guiding the control rod adjacent its top in its vertical action.

The forward trolley dog 19' is modified slightly, as compared with the dog 19 of the first embodiment, in that its arm 48' has a portion extending horizontally when the dog 19 is in an elevated position for propulsion by a power dog 14, and in this position rests on the top of the forked finger 140 of rod 135. The rear finger 141 is shortened and downwardly inclined at 143 to provide top clearance for arm 48'.

Thus it is seen that, since the control rod 135 need not be guided vertically by passing through apertured parts, as in the embodiment of FIGS. 4–6 and 10–12, it may be fabricated of increased thickness for added rigidity, being externally guided by the fingers 140, 141 and anti-friction rollers 137, 138, as well as laterally by the webs 134 of body stampings 133.

The bumper 132 is similar to the bumper 100 of the embodiment of FIGS. 10–12, in that it has laterally spaced upright and parallel suspending plates 145 extending upwardly on either side of the trolley body, and secured thereto by cross bolts 103' extending through holes 53' in the trolley body, with suitable spacing shims 146 interposed between the plates 145 and the sides of stampings 133. These securing arrangements are, as before, on the forward and rearward sides of the longitudinal center line of the trolley. However, as contemplated by the invention as illustrated in FIGS. 14 and 15, a load hanger unit, generally designated 148, is suspended directly from the bumper 132 itself, rather than from an elevated point on the trolley, as in FIGS. 10, 11 and 12. In further accordance with the invention in this embodiment, the suspension is such that, whether the trolley-bumper assembly is traveling horizontally or is riding a track incline, the line of suspension of the hanger 148 will pass through the longitudinal center line of the load trolley 131, i.e., through the openings 32' midway between the forward and rearward trolley wheels 104', 105'. The line of suspension is always gravitationally vertical, as will appear from the solid line position of hanger 148 and its relative dotted line position when the trolley-bumper assembly is ascending or descending the track incline.

To the above ends, each of the upright parallel plates 145 is provided with a laterally opening arcuate track aperture, slot or way 150, which is elongated in the forward-rearward direction and is mildly concave upwardly, as shown in FIG. 14. Similarly arcuate track or way members 151 are welded along the tops of the lower arcuate edges of these openings, extending substantially inwardly of the respective plates 145.

The openings 150 and track or way members 151 are preferably formed rectilinear, or to provide a flat, for a very short distance at the longitudinal center thereof, as indicated at 152, so as to provide a local central seat in each of the ways 151, for a purpose to be described.

In this embodiment, the hanger 148 is constituted by hanger straps 154 of substantial thickness and width; and each such strap has an inwardly projecting pin 155 adjacent its top which serves as a journal for an anti-friction suspension roller 156 riding the adjacent track or way 151. As shown in FIG. 15, the hanger straps 154 depend quite closely adjacent the sides of bumper plates 145, so that any tendency thereof to twist about the upright axis of the hanger through its suspension pivot at roller 156 is resisted effectively, not only by the relatively generous cross section dimensioning of the cross straps 154, but also by the side restraining, anti-twist action of the bumper plates 145.

It is seen from the above, and as illustrated in FIG. 14, that when the assembly of trolley 131 and bumper 132 is traversing a horizontal straightaway track portion, the hanger 148 will be gravitationally suspended on a vertical line through the longitudinal center line of the trolley, midway between its track wheels 104', 105'; and that the suspension rollers 156 will lie in the central seat 152 of each way 151. It is also seen (by tilting the sheet bearing FIG. 14 about 30° counterclockwise, this being the maximum track incline that will be encountered) that the line of suspension remains vertical and through the longitudinal trolley center. There is, therefore, no tendency for the load to cause upending in either direction of the trolley, as has been the case in previous designs.

The invention affords a trolley of great simplicity, yet very reliable in operation, constituted by identical stampings having alternatively available sets of openings therethrough for the reception of trolley dog pivot pins, track rollers, securing bolts and side guide rollers. Coupled with an improved trolley structure having body features of this sort, the invention affords an improved arrangement for pivoting or swiveling a load bumper unit thereon to swing about an upright axis, as in a two-wheeled unit, the swiveling provisions being very compact, yet, by reason of the outrigger action of the saddle 67 against the trolley body 16, of good stability to withstand shock and operating stress. Undue elongation of the bearing means, such as would undesirably lower the load support point beneath track 11, are avoided.

A further trolley feature which is of utmost importance is that of bringing the line of action of the control rod 24 vertically through the swiveling center of the bumper suspension in both the two wheel and four wheel trolleys, but particularly advantageous in the former. Assurance is had that an effective engagement of the upper end of rod 24 with the forward trolley dog 19 will be had regardless of the swivel position of the load relative to the trolley, as in rounding a relatively abrupt track curve. As for the four wheel trolley, the invention includes a novel feature of suspending the load pivotally from a point on the trolley midway between the forward and rearward pairs of track rollers, thus allowing a free pivoted swinging suspension of the load on a vertical line, whether in horidontal travel or in ascending or descending a slope in the track.

Moreover, and in special reference to the embodiment of FIGS. 14 and 15, it is a simple and speedily performed matter to change the trolley setup from a two wheel one to a four wheel one, since, lacking as it does a cross pin or roller axle having a cross bore internally receiving and guiding an accumulation control rod, a plain central guide pin 142 may be employed for guidance of the rod fingers 140, 141 in a four-wheel type, a similar plain pin serving as an axle in a two-wheel type. It is unnecessary to enlarge the center diameter of such pin to permit cross-boring of the same, and the pin 142, or corresponding wheel axle pin, may simply be slipped in place from a side of the trolley body.

Further in accordance with the invention, the releasing disengagement of the forward trolley dog from the power chain pusher lug 14 is in all embodiments in a forward and downward direction, thereby imposing no additional force resisting the advance of the lug, and accordingly subjecting the trolley to no additional propelling force tending to ram the same against a preceding trolley at an accmulation station on the track.

FIGS. 16 through 20 show an alternative arrangement of trolley and load carrier swivel connection for a two-wheel type trolley, adapted to be employed in substitution for the rock limiting outrigger arrangement at the swivel between load carrier and trolley, as illustrated in FIGS. 4, 5 and 6. Here the trolley body is generally designed 158, and may be formed of two mated sheet metal stampings 159 such as are described in the earlier embodiments, having provisions for the selective mounting of either one pair or two pairs of track load rollers such as the rollers 34 or 104. The sheet metal saddle of the load bumper (not shown) is designated 160, and is in this case fabricated in its inverted U-shaped cross sectional outline (FIGS. 17 and 18) of a pair of like L-shaped stampings 161, 162 aranged with top flanges reversed and overlapped, and welded or other wise fixedly secured in this arrangement. It will be understood that an accumulation mechanism (not shown) will be appropriately mounted between the depending arms of these stampings in the manner illustrated in FIG. 4.

Also as in the case of FIG. 4, a swivel yoke body or fitting is received between the stampings 159 of body 158. This yoke body or fitting is similar to the fitting 42 of FIG. 4, and is correspondingly arranged relative to the trolley body 158, so that corresponding reference numerals, primed, are employed for simplicity to designate corresponding parts. The yoke fitting 42' is characterized by a vertical bore 61' to receive the control rod, designated 163, which is, as shown in FIGS. 19 and 20, of square cross section. It cooperates with an accumulation control mechanism (not shown) in the manner described previously.

Forwardly and rearwardly of the swivel yoke member 42', the trolley body 158 receives between the metal stampings 159, a pair of like bronze anti-friction feet or shoes, each generally designated 164, to limit vertical rock of the bumper body 160. These members are of inverted T-shaped cross section, including an upright connecting lug 165 clamped between the outwardly flanged lower edges of the stampings by a bolt 165, and a laterally outwardly flanged anti-friction bearing foot 166 which rides on the upper, full width surface of the horizontal flange of the stamping 162 of bumper body 160. It is intended that only a slight working clearance be present between this flange and the foot 166, sufficient to permit free horizontal swiveling of the body 160, yet not to permit undue vertical rock of the bumper and body 160 relative to the trolley body 158.

The tubular extension 60' of the swivel yoke body 42' extends downwardly through an aperture in the overlapped bumper body flanges 161, 162, and through a square annular bearing holding spacer 168 positioned therebeneath, and receives the inner race of a combined radial and axial thrust bearing 169, the outer race confining housing 170 of which is contained in a recess in spacer 168. The retainer ring 71' is threaded on the lower, reduced diameter portion of yoke body extension 60', engaging upwardly against bearing 169 and, through the spacer 168, against the hanger yoke body 160. This permits the slight vertical clearance between the bronze anti-friction bearing feet 166 of the trolley body 158 and the bumper body 160 to be adjusted as desired.

The structure of FIGS. 16 through 20 is one which is considerably simplified, as compared with that of FIG. 4, and has even greater compactness in the vertical sense, also eliminating the need for universal rocking provisions. Rocking tendency is sustained by the bearing members 164 on either side of the swivel axis, yet without imposing any substantial or even significant resistance to free swiveling action.

The embodiment of the invention illustrated in FIGS. 21–26 of the drawings provides an additional type of control for the release of the trolleys from the power chain, namely, under actuation by a suitable stop type of accumulation control device or mechanism adjacent the trolley track. Features of the trolley itself, including body, load rollers, guide rollers, chain engaged dogs, etc., as well as basic components of its bumper-responsive control rod actuating linkage, are very similar if not exactly identical to those described in connection with FIGS. 1 through 12. Hence corresponding reference numerals, double-primed, will be employed to designate such corresponding structural features and relationships, and further extended description in these regards will be dispensed with.

Referring to FIGS. 21 and 22, the control cam 84" (FIG. 22 alone) is fixed mounted to a horizontal actuating rod or shaft 172 of hexagonal section which extends laterally outwardly from the longitudinal center of the load bumper 100", at which it is secured to the cam 84", through one side of said bumper. It is suitably journaled by ball bearings 173 in one of two upright hanger plates 174 (corresponding to the plates 101 of FIGS. 10 and 12) to which the bumper 100" is rigidly secured, as by welding. These plates are, at the outer ends thereof, rigidly secured to the bottom of trolley body 16", since the trolley is a four wheel type, with no swiveling of the bumper or load carrier 100" relative to the trolley proper.

Outwardly of the bumper, the hexagonal shaft 172 has fixedly secured thereto a cam operating arm or lever 176 provided at its outer extremity with a suitable anti-friction roller 177. This roller is adapted to coact with an appropriate manually or automatically controlled trolley stop and accumulator mechanism, generally designated 179, associated with the conveyor adjacent one side of the track structure 11".

For the purpose of mounting the mechanism 179, the main overhead, power trolley track 180 of the installation, along which driving trolleys 181 are advanced by a continuously traveling power chain 182 (such chain driving the propelling dogs 14" in well known fashion), has a rugged cross beam 183 of U-shaped cross section welded to the top thereof and extending substantially horizontally outwardly thereof, to a zone overlying the cam actuator arm or lever 176, being substantially spaced above the latter. Beam 183 in turn has welded to a side flange thereof a vertically depending channnel support or hanger 184 of relatively deep, U-shaped cross section, this hanger serving, incidentally, as a support for one of the load supporting tracks 11", as shown in FIGS. 21 and 22.

Beam 183 pivotally supports from above, as by means of an apertured depending bracket 185, an air cylinder 186, the plunger 187 of which is in turn pivotally connected by a clevis 188 with the outer end of a stop actuating bar or rod 189. The opposite end of such rod 189 is pivotally mounted on the cylindrical pivot end 190 of a laterally projecting bar or rod 191 which is welded to a flange of the upright channel hanger 184.

Actuating rod 189 has fixedly mounted thereon, adjacent the outermost, actuated end thereof a stop plate 193 of special contour which is engaged (in the lowered, operative position of the plate shown in FIGS. 21 and 22) by the anti-friction roller 177 of cam actuating arm or lever 176. The trolley is at this time moving in the direction indicated by the arrow in FIG. 21; and as the motion of the trolley continues, under propulsion of its forward dog 19" by the power chain dog 14", roller 177 is caused to move downwardly along an adjacent vertical edge 194 of stop plate 193, then pass around the lower corner of this edge and beneath a horizontal bottom dwell surface 195 of the plate, after which it comes into abutment with a final stop extension 196 of the plate, coming to rest and halting the trolley.

The purpose of the dwell surface 195 is to depress the arm 176 even if the trolley should tend to rebound to some extent as the roller 177 strikes extension 196. The roller 177 is shown, as so halted in dotted line in FIG. 21; and the result of its motion as described is to rock the actuating lever 176 clockwise, as viewed in that figure, correspondingly rotating cam actuator shaft 172 and the trolley rod actuating cam 84", dropping the control rod, to be described. The effect of decoupling the trolley dog 19" from the chain dog 14" is the same as in the previously described embodiments.

In order to stabilize the load bumpers 100" it is desirable, as illustrated in FIGS. 21 and 22, to equip the same with laterally outwardly flanged support plates or feet 198 adjacent opposite longitudinal sides thereof, which are adapted to pass onto supporting rollers 199 fixedly journaled at the stop station beneath the pneumatic cylinder-operated stop and accumulator mechanism 179.

It is seen to be the function of the last named mechanism to halt trolleys 12" and load carriers 100" at a predetermined position in the conveyor path, independently of the individual bumper actuated linkages of the respective trolleys and load carriers. Thus, with a given trolley halted at the stop station, following carriers will accumulate behind the same, under individual, bumper-responsive chain and trolley dog decoupling actions. When the first carrier is released, as by appropriate valving operation of the pneumatic cylinder unit 186 by a workman at the stop station, or by remote control upon operation of the conventional type valve means (not shown), the pneumatic unit 186 elevates stop plate 193 by swinging its mounting bar or rod 189 about the pivot at 190. Thus freed, the first carrier becomes engaged at its trolley dog 19" by the next approaching power chain dog 14" and is advanced along the track 11". The stop plate 193 may be restored again immediately to halt the next following carrier, or a number of carriers may be permitted to proceed past the stop zone prior to further accumulation.

Now referring to FIGS. 23–26 in conjunction with FIGS. 21 and 22, the cam 84", as actuated by the shaft or rod 172, is provided with a bracket 200 to which the pumper actuated linkage of the carrier is connected, this linkage including the operating link 90", the coil spring 98", and a bumper lever 201 corresponding in function to the part 94 of the first embodiment, but in this case in the form of connected L-shaped castings. It is equipped with an impact nose 202 at its upper, forward extremity.

The trolley dog control rod of this embodiment is specially designated 204. It is in the form of a rod bent to provide a lower bight portion 205, the upstanding legs 206 of which are rigidly connected by a welded piece 207. The legs 206 rollingly engage an anti-friction spool 208 journaled between the bumper hangers 174 on a pin 209. Above the piece 207 the legs pass on either side of a shaft 210 normal to the trolley body plates 16", and the upper end of one thereof upwardly sustains the trolley dog 19", in position for engagement with chain dog 14", when cam 84" is in the operative position shown in FIG. 23. Otherwise, and assuming that the trolley is not halted by the stop mechanism 193, the trolley rod 204 is lowered to the dotted line position.

FIG. 27 of the drawings depicts a condition which may arise when the trolley and loads are being operated in a relatively low speed or momentum range, for example, beneath an intermediate speed range of, say, 15 feet to 30 feet per minute, or a correspondingly low momentum range determined by the weight of the load transported. In such intermediate range, the momentum of a load bumper striking one preceding it will suffice to fully actuate the control linkage and also the forward propelled trolley dog 19, 19' or 19" of any of the preceding embodiments fully downwardly and out of position for driving engagement with the power chain pusher dog 14. Naturally, the same will result when the speed or momentum exceeds the intermediate range instanced. In the lower range referred to it sometimes occurs that the impact will be insufficiently great to cause the forwardly projecting bumper tongue corresponding to the member 89, 89' or 202 to ride fully up the rear of the bumper struck thereby, and thus fully drop the trolley propelled dog downwardly, to the position illustrated, for example, in dotted line in FIGS. 4 and 23. The tongue, in only partially overriding the preceding bumper, may leave the propelled trolley dog only partially depressed, as shown in FIG. 27.

It is a fact that, for successful propulsion of the trolleys by the pusher dog 14 of the overhead power chain, it is necessary that the last named dog have a substantial downward vertical overlap in relation to the trolley dog. However, it is equally a fact that it is impractical to keep the power chain, as it rides the flanges of an overhead monorail (see FIG. 22), from rising to some degree, with the result that its pusher 14 will (in the only partially depressed position of the trolley dog) ride or cam itself over the top of the latter in the manner illustrated in dotted line in FIG. 27. This condition, and the repeated clickings and interference as the trolleys pass over the partially lifted trolley dog, are objectionable; and accordingly the further modified and improved features shown in FIGS. 28 to 32 are resorted to to establish a full decoupling of the trolley propelled dogs from the power chain under the low speed or low momentum condition of operation just described.

By the same token, further improvements combined with those to meet these considerations serve to counteract the effects of possible load rebound at an accumulation station under conditions of higher than average speed and/or momentum operation. Since many of the features of the embodiment of FIGS. 28 through 32 substantially duplicate those of FIGS. 21 through 26, corresponding reference numerals will be employed to indicate corresponding structure and relationships, and further description will be dispensed with.

The cam which operates the vertically decoupling control rod is designated 212. It is in general shaped similarly to the cam 84 above described and features an integral forked depending bracket 213 which is, adjacent its bottom, split and clamped to the non-circular shaft 172, as in the embodiment of FIGS. 21–26. It will be noted that the embodiment of FIGS. 27–32 is optionally adapted to be operated by a selectively controlled, track mounted bumper stop, as in the earlier embodiment, and this fact is indicated by the presence, as shown in dot-dash line in FIG. 28, of the anti-friction roller carrying arm 176 clamped to shaft 172 outboard of the load bumper, as in the fashion shown in FIGS. 21, 22 and 24 of the drawings.

A thrust and reset link 214 is pivotally mounted at 215 to the bracket 213, above the pivotal axis thereof, link 214 extending forwardly through a vertically elongated slot 216 in the front end of the bumper, here designated 217. At this forward end of link 214 the latter is reduced in vertical height to provide a stop shoulder 214' for the purpose to be described. The bumper tongue, generally designated 218, is in the form of a bell crank having a medial boss 219 pivoted on the bumper at 220. An upwardly and forwardly angled leg 221 extends upwardly from the pivot point, terminating in an impact member 222 adapted to contact the rear of the preceding load bumber 217, in the manner of the previously described embodiments. A rearwardly and downwardly extending arm 223 of the bell crank tongue 218 is connected to a coiled tension spring 224 anchored on the bumper at 225, the spring biasing the tongue 218 clockwise, as viewed in FIG. 28. Each bumper is preferably equipped with impact pads 226 at the rear and on opposite sides of the center point thereof, out of position for engagement by an impact member 222 or link 214.

Bell crank tongue 218 is provided with a fixed, laterally projecting pin 228 which is slidably received in an elonated horizontal slot 229 formed in control and reset link 214 rearwardly of the stop shoulder 214' of the latter.

In order to effect an insured, trolley-decoupling release action of the control rod 204, not reliant upon a full and complete riding of the bumper tongue member 222 upwardly and over the rear of the impacted, preceding load bumper, the non-circular shaft 172, to which cam 212 is affixed by bracket 213, is provided with an actuating arm 230, also fixedly secured to the shaft so that the bracket 213 and arm 230 act as a bell crank.

A coiled tension spring 231 is connected at 232 to the outer end of arm 230, and is rearwardly anchored to its opposite end to the bumper 217 at 233. The normal position of the arm 230, with the cam 212 fully underlying and sustaining the control rod 214, is the horizontal position shown in dotted line in FIG. 28. In this position, the abutment shoulder 214' on link 214 engages forwardly against the bumper, above the slot 216 in the later, thus acting as a stop to limit further clockwise movement of arm 230 from the dotted line position. As appears in FIG. 28, the anchor 233 for spring 231 is on a line through the axis of shaft 172 and the spring connection at 232, i.e., the arm 230 is in a dead center position, but will be strongly snapped counterclockwise by spring 231 to the solid line position of FIG. 28, under actuation in a manner presently to be described. The parts referred to up to this point constitute all that are required for operation under the low speed or momentum conditions referred to above. Others (hereinafter described) relate more particularly to installations for operation in the higher speed or momentum range, and may be dispensed with under the conditions of operation now to be considered.

Assuming that the bumper tongue 218 impacts a preceding load bumper 217 with a force or momentum insufficient to cause it to ride fully up and over the rear of that bumper, this normally will leave the propelling dog 19" of the trolley in only partially depressed position as shown in dotted line in FIG. 27 of the drawings. It follows, as shown in FIG. 27, that, with the only slight vertical overhang of the chain pusher dog 14 relative thereto, any relatively slight upward shift of pusher dog 14 will simply result in the latter clicking over the top of trolley dog 19″. It is desirable that the possibility of this condition arising be eliminated.

Therefore, in accordance with the improvement under consideration, the action is as follows, reference being particularly made to FIG. 33, in conjunction with FIG. 28.

In initially contacting the rear of the preceding bumper 217, as in the position of the parts shown in solid line at the right-hand side of FIG. 33, the tongue 218 of bumper 217 will proceed to swing upwardly to, say, an intermediate position shown in dotted line in that figure, the trolley and load having insufficient momentum to elevate the bumper tongue further.

As thus shifted, bumper tongue 218 has no effect whatsoever in shifting the thrust link 214 to the left, due to its pin and slot connection at 228, 229 to that link. Consequently, the cam 212 remains in the operative, dotted line position, the link 214 having been swung only slightly downwardly from its original, dotted line position, due to the downward camming action of pin 228 thereon. The control rod 204 remains elevated, sustaining the trolley dog 19″ in its lifted and operative position, shown in solid line in FIG. 27, and the chain pusher 14 continues to push trolley 16″ forwardly. The result is that bumper tongue 218 continues to be swung upwardly until its dot-dash line position of FIG. 33 is reached, clearing the top of the preceding bumper 217, but it still has had no effect of pushing thrust link 214 to the left, as viewed in FIGS. 28 and 33.

This takes place when the preceding, impacted bumper, of its impact pad 226, becomes engaged by the right-hand end of thrust link 214, in the position of the parts shown in the left-hand, solid line position appearing in FIG. 33 (although the shift of the link could be accomplished were its slot 229 shortened in length so as to be engaged by the link's pin 228 in the swinging of bumper tongue 218).

The instantaneous result, following the swinging of cam bracket 215 about its pivot at shaft 172, is that the actuator arm 230 of this bracket, and its cam 212, swing upwardly above its dead center line, whereupon its spring 213 snaps the arm and fixedly connected cam 212 fully from the operative, dotted line position of FIG. 28 to the inoperative, decoupling position shown in solid line. Control rod 204 descends fully, and the trolley pusher dog 19″ follows the same downwardly, releasing from engagement with the overhead pusher dog 14 in a forwardly and downwardly swinging motion which offers no further resistance to the pusher, hence instantaneously decouples the trolley at the accumulation station, and the trolley comes to rest without appreciable rebound.

When the preceding, impacted trolley is next advanced or removed, the tongue 218 will be restored to its operative position, shown in dotted line in FIG. 28 and in solid line in FIG. 33, by its biasing spring 224. Since the shifting of thrust link 214 to the left has brought the right-hand end of its slot 229 against the bumper tongue pin 228, the downward swing of tongue 218 pulls link 214 to the right to its original position, shown in dotted line in FIG. 28 and solid line in FIG. 33, the pin 228 camming the link upwardly so that the shoulder 214′ of the latter forward abuts the forward end of bumper 217, acting as a stop to further movement of the link and further counterclockwise swing of the control rod cam 212, in the dotted line position of the latter appearing in FIG. 28. The parts are now reset for any further accumulation function, performed in the manner described above.

In an installation for high speed or high momentum trolley and load conditions of operation, further structural features are provided to prevent undesired rearward rebound of the impacting load.

The bumper tongue 218 is provided, adjacent the forward lower heel thereof, with a latch spur 235. The only further modifications are in the provision of a bell crank latch 236 at the rear of each load bumper 217 for coaction with the latch spur 235. This lever is medially pivoted on the bumper at 237, and has a rearwardly extending arm 238 provided with an upwardly facing catch or latch member 239. The other arm 240 of bell crank 236 extends downwardly, and has pivoted thereon, at 241, a forwardly extending reset link 242, which is pivoted at 243 to the pivoted bracket 213 of cam 212.

In the operation of the system, with the load bumpers equipped with high speed, anti-rebound provisions as described, it will be assumed that the forward load bumper which has been halted at the accumulation station, and which will be struck from the rear under considerable shock by a following bumper, will have had its latching bell crank 236 swung clockwise (as viewed in FIG. 28) under force transmitted to it through the connecting link 242 from the cam bracket 213 when the cam 212 of this forward bumper was swung to the inoperative, decoupling position shown in FIG. 28. This swings the latching member 239 of bell crank 236 upwardly to the operative position of that figure.

Thus, the bumper tongue 218 of the next oncoming load bumper 217 will ride up over the latch member 239, its biasing spring 224 yielding to permit this and then snapping the latch spur 235 of the tongue 218 down over the latch member 239 and leaving the parts coupled against shock rebound, in the manner illustrated in solid line in FIG. 28 of the drawings.

When the preceding, impacted bumper 217 is freed to move away, as being freed from forward restraint of one sort or another, its bumper tongue 218 is biased forwardly and downwardly by its biasing spring 224. The pin 228 of said tongue is moved to the right upon clockwise swing of the tongue about pivot 220, the pin engages the right-hand end of the slot 229 in link 214, shifting the latter to the right (FIG. 28), the cam 212 is swung clockwise about its pivot at 172, the link 242 is tensioned, and the latch bell crank 236 is swung counterclockwise about its pivot at 237, retracting the latch member 239 to the dot-dash line position of FIG. 28, beneath the level of the rear of the bumper 217. Thus, this bumper has its control rod 204 re-elevated to operative position to permit trolley dog 19″ to be engaged by a chain pusher 14; and at the same time the bumper upon which these operations have been performed is simultaneously freed from its tied up relationship to the bumper which previously struck it.

As indicated above, the anti-rebound provisions, involving the latch spur 235 on bumper tongue 218, the latch bell crank 236 and link 242 may be eliminated when not needed in a low speed or intermediate speed installation. Of course, in the interest of standardization of parts for various installations, it is probably desirable, in such case, to retain the latch spur 235, although it will be substantially function-less in the operation of the system under such low intermediate momentum circumstances.

What we claim as our invention is:

1. A traveling load supporting trolley, comprising a trolley body having transverse wheel axle journaling openings on opposite sides of the longitudinal center of said body and a further transverse wheel axle journaling opening between said first named wheel axle journaling openings, a pair of trolley dogs pivotally mounted on and projecting upwardly of said body carried on axles thereof, said body having means for the selective pivotal mounting of said dogs differently as a pair in relation to the body center, track wheels for said trolley, and means for selectively mounting said axles in certain of said openings to permit the support of the trolley by a wheel pair coaxial with said further opening, or by wheel pairs respectively coaxial with said first named openings.

2. A traveling load supporting trolley, comprising a trolley body having longitudinally spaced, transverse dog pivoting openings disposed in pairs on opposite sides of the longitudinal center of the body, transverse wheel axle journaling openings on opposite sides of said longitudinal center, and a further transverse wheel axle journaling opening between said first named wheel axle journaling openings, a pair of trolley dogs projecting upwardly of said body carried on axles thereof, track wheels for said trolley, and means for selectively mounting said dogs and axles in certain of said openings to permit the support of the trolley by a wheel pair coaxial with said further opening, or by wheel pairs respectively coaxial with said first named openings, and to permit selective pivoting of said dogs coaxially of either of said first named dog pivoting openings.

3. A traveling load supporting trolley, comprising a trolley body having longitudinally spaced, transverse dog pivoting openings similarly oriented thereon disposed in pairs on opposite sides of the longitudinal center of the body, transverse wheel axle journaling openings on opposite sides of said longitudinal center, and a further transverse wheel axle journaling opening between said first named wheel axle journaling openings, a pair of trolley dogs projecting upwardly of said body, track wheels for said trolley, and means for selectively mounting said dogs and axles in certain of said openings to permit the support of the trolley by a wheel pair coaxial with said further opening, or by wheel pairs respectively coaxial with said first named openings, and to permit selective pivoting of said dogs coaxially of either of said first named pairs of dog pivoting openings.

4. A traveling load supporting trolley, comprising a trolley body formed of a pair of similar body members secured to one another in mating transverse engagement, said body members each having transverse wheel axle journaling openings on opposite sides of the longitudinal center of said body, and a further transverse wheel axle journaling opening between said first named wheel axle journaling openings, a pair of trolley dogs pivotally mounted on and projecting upwardly of said body, said body having means for the selective pivotal mounting of said dogs differently as a pair in relation to the body center, track wheels for said trolley, and means for selectively mounting said axles in certain of said openings to permit the support of the trolley by a wheel pair coaxial with said further opening, or by wheel pairs respectively coaxial with said first named openings.

5. A traveling load supporting trolley, comprising a trolley body formed of a pair of similar body members secured to one another in mating transverse engagement, said body members each having longitudinally spaced, transverse dog pivoting openings disposed in pairs on opposite sides of the longitudinal center of the body, transverse wheel axle journaling openings on opposite sides of said longitudinal center, and a further transverse wheel axle journaling opening between said first named wheel axle journaling openings, a pair of trolley dogs projecting upwardly of said body carried on axles thereof, track wheels for said trolley, and means for selectively mounting said dogs and axles in certain of said openings to permit the support of the trolley by a wheel pair coaxial with said further opening, or by wheel pairs selectively coaxial with said first named openings, and to permit selective pivoting of said dogs coaxially of either of said first named dog pivoting openings.

6. A traveling load supporting trolley, comprising a trolley body formed of a pair of similar body members secured to one another in mating transverse engagement, said body members each having pairs of transverse dog pivoting openings similarly oriented thereon on opposite sides of the longitudinal center of the body, transverse wheel axle journaling openings on opposite sides of said longitudinal center, and a further transverse wheel axle journaling opening between said first named wheel axle journaling openings, a pair of trolley dogs projecting upwardly of said body carried on axles thereof, track wheels for said trolley, and means for selectively mounting said dogs and axles in certain of said openings to permit the support of the trolley by a wheel pair coaxial with said further opening, or by wheel pairs respectively coaxial with said first named openings, and to permit selective pivoting of said dogs coaxially of either of said first named pairs of dog pivoting openings.

7. A traveling load supporting and accumulation unit, comprising a trolley body having longitudinally spaced dogs pivotally mounted thereon and presenting portions adapted to be engaged by trolley propulsion means, transversely aligned track wheels on said trolley body, a load member carried by said trolley body in depending relation thereto, and an accumulation mechanism mounted on said load member, including a control element movably mounted on said load member to act on a line passing between said dog portions, said element releasably sustaining one of said dogs in a position for propulsion by said propulsion means.

8. A traveling load supporting and accumulation unit, comprising a trolley body having longitudinally spaced dogs pivotally mounted thereon and presenting portions adapted to be engaged by trolley propulsion means, transversely aligned track wheels on said trolley body, including a coaxial wheel pair, a load member carried by said trolley body in depending relation thereto, and an accumulation mechanism mounted on said load member, including a control element movably mounted on said load member to act on a line passing between said dog portions and through the axis of said wheel pair, said element releasably sustaining one of said dogs in a position for propulsion by said propulsion means.

9. A traveling load supporting and accumulation unit, comprising a trolley body having longitudinally spaced dogs pivotally mounted thereon and presenting portions adapted to be engaged by trolley propulsion means, transversely aligned track wheels on said trolley body, including forward and rearward coaxial wheel pairs, a load member carried by said trolley body in depending relation thereto, and an accumulation mechanism mounted on said load member, including a control element movably mounted on said load member to act on a line passing between said dog portions and between the axes of said wheel pairs, said element releasably sustaining one of said dogs in a position for propulsion by said propulsion means.

10. A traveling load supporting and accumulation unit, comprising a trolley body having longitudinally spaced dogs pivotally mounted thereon and presenting portions adapted to be engaged by trolley propulsion means, transversely aligned track wheels on said trolley body, a load member carried by said trolley body in swiveled depending relation thereto to swing relative to said body about an upright swivel axis, and an accumulation mechanism mounted on said load member to swing therewith, including a control element movably mounted on said load member to act on a line representing the swivel axis of said load member, said element releasably sustaining one of said dogs in a position for propulsion by said propulsion means.

11. A traveling load supporting and accumulation unit, comprising a trolley body having longitudinally spaced dogs pivotally mounted thereon and presenting portions adapted to be engaged by trolley propulsion means, transversely aligned track wheels on said trolley body, a load member carried by said trolley body in swiveled depending relation thereto to swing relative to said body about an upright swivel axis, and an accumulation mechanism mounted on said load member to swing therewith, including a control element movably mounted on said load member to act on a line representing the swivel axis of said load member, said element releasably sustaining one of said dogs in a position for propulsion by said propulsion means, and means actuated by contact with another object to cause said control element to release said dog to move out of said propulsion position.

12. A traveling load supporting and accumulation unit, comprising a trolley body having longitudinally spaced dogs pivotally mounted thereon and presenting portions adapted to be engaged by trolley propulsion means, transversely aligned track wheels on said trolley body, a load member carried by said trolley body in swiveled depending relation thereto to swing relative to said body about an upright swivel axis, and an accumulation mechanism mounted on said load member to swing therewith, including a control element movably mounted on said load member to act on a line representing the swivel axis of said load member, said element normally sustaining one of said dogs in a position for propulsion by said propulsion means, a cam controlling the vertical position of said control element, and means actuated by contact with another object to move said cam to a position in which it permits said dog to move out of said propulsion position.

13. A traveling load supporting and accumulation unit, comprising a trolley body having longitudinally spaced dogs pivotally mounted thereon and presenting portions adapted to be engaged by trolley propulsion means, transversely aligned track wheels on said trolley body, a load member carried by said trolley body in depending relation thereto, and an accumulation mechanism mounted on said load member, including a control element movably mounted on said load member to act on a line passing between said dog portions, said element normally sustaining one of said dogs in a position for propulsion by said propulsion means, and means actuated by contact with another object to cause said control element to move to a position in which it permits said dog to move out of said propulsion position, said last named dog being pivoted on said trolley body for said last named movement with a component in the direction of the propulsion.

14. A traveling load supporting and accumulation unit, comprising a trolley body having longitudinally spaced dogs pivotally mounted thereon and presenting portions adapted to be engaged by trolley propulsion means, transversely aligned track wheels on said trolley body, a load member carried by said trolley body in swiveled depending relation thereto to swing relative to said body about an upright swivel axis, and an accumualtion mechanism mounted on said load member to swing therewith, including a control element movably mounted on said load member to act on a line representing the swivel axis of said load member, said element normally sustaining one of said dogs in a position for propulsion by said propulsion means, and means actuated by contact with another object to cause said control element to move to a position in which it permits said dog to move out of said propulsion position, said last named dog being pivoted on said trolley body for said last named movement with a component in the direction of the propulsion.

15. A traveling load supporting and accumulation unit, comprising a trolley body having forward and rearward dogs pivotally mounted thereon and presenting portions adapted to be engaged by trolley propulsion means, said body having transverse forward and rearward wheel axle journaling openings and a further transverse wheel axle journaling opening between said openings, track wheels for said trolley body carried on axles thereof, means for selectively mounting said axles in certain of said openings to permit the support of the trolley body by a wheel pair coaxial with said further opening, or by wheel pairs respectively coaxial with said first named openings, a load member carried by said trolley body in swiveled depending relation thereto to swing relative to said body about an upright swivel axis, and an accumulation mechanism mounted on said load member to swing therewith, including a control rod movably mounted on said load member to act on a line representing the swivel axis of said load member, said rod engaging and normally sustaining said forward dog in a position for propulsion by said propulsion means, and means actuated by contact with another object to cause said control rod to move to a position in which it permits said dog to move out of said propulsion position.

16. A traveling load supporting and accumulation unit, comprising a trolley body having forward and rearward dogs pivotally mounted thereon and presenting portions adapted to be engaged by trolley propulsion means, said body having transverse forward and rearward wheel axle journaling openings and a further transverse wheel axle journaling opening between said openings, track wheels for said trolley body carried on axles thereof, means for selectively mounting said axles in certain of said openings to permit the support of the trolley body by a wheel pairs selectively coaxial with said first named openings, load member carried by said trolley body in swiveled depending relation thereto to swing relative to said body about an upright swivel axis, and an accumulation mechanism mounted on said load member to swing therewith, including a control rod movably mounted on said load member to act on a line representing the swivel axis of said load member and passing between said dog portions and through said further opening, said rod engaging and normally sustaining said forward dog in a position for propulsion by said propulsion means, a cam controlling the vertical position of said control rod, and means actuated by contact with another object to move said cam to a position in which it permits said dog to move out of said propulsion position.

17. A traveling load supporting and accumulation unit, comprising a trolley body having forward and rearward dogs pivotally mounted thereon and presenting portions adapted to be engaged by trolley propulsion means, said body having transverse forward and rearward wheel axle journaling openings and a further transverse wheel axle journaling opening between said openings, track wheels for said trolley body carried by axles thereof, means for selectively mounting said axles in certain of said openings to permit the support of the trolley body by a wheel pair coaxial with said further opening, or by wheel pairs respectively coaxial with said first named openings, a load member carried by said trolley body in swiveled depending relation thereto to swing relative to said body about an upright swivel axis, and an accumulation mechansim mounted on said load member to swing therewith, including a control rod movably mounted on said load member to act on a line representing the swivel axis of said load member, said rod engaging and normally sustaining said forward dog in a position for propulsion by said propulsion means, and means actuated by contact with another object to cause said control rod to move to a position in which it permits said dog to move out of said propulsion position, said forward dog being pivoted on said trolley body for said last named movement with a component in the forward direction.

18. A traveling load supporting and accumulation unit, comprising a pair of side members providing a trolley body having a dog pivotally mounted thereon and adapted to be engaged by trolley propulsion means to propel said body, forward and rearward track wheels on said trolley body, a load member carried by said trolley body in depending relation thereto, and an accumulation mechanism mounted on said load member, including a control rod movably mounted on said load member to act upwardly on a line passing between the axes of said forward and rearward wheels and between said side members of said body, said rod engaging and normally sustaining said dog in a position for propulsion by said propulsion means, and means actuated by contact with another object to cause said rod to move to a position in which it permits said dog to move out of said propulsion position.

19. A traveling load supporting and accumulation unit, comprising a pair of side members providing a trolley body having a dog pivotally mounted thereon and adapted to be engaged by trolley propulsion means to propel said body, forward and rearward track wheels on said trolley body, a load member carried by said trolley body in depending relation thereto, and an accumulation mechanism mounted on said load member, including a control rod movably mounted on said load member to act upwardly on a line passing between the axes of said forward and rearward wheels and between said side members of said body, said rod engaging and normally sustaining said dog in a position for propulsion by said propulsion means, and means actuated by contact with another object to cause said rod to move to a position in which it permits said dog to move out of said propulsion position, said dog being pivoted on said trolley body for said last named movement with a component in the direction of the propulsion.

20. A traveling load supporting and accumulation unit, comprising a pair of side members providing a trolley body having a dog pivotally mounted thereon and adapted to be engaged by trolley propulsion means to propel said body, forward and rearward track wheels on said trolley body, a load member carried by said trolley body, in depending relation thereto, and an accumulation mechanism mounted on said load member, including a control rod movably mounted on said load member to act upwardly on a line passing between the axes of said forward and rearward wheels and between said side members of said body, said rod engaging and normally sustaining said dog in a position for propulsion by said propulsion means, and means actuated by contact with another object to cause said rod to move to a position in which it permits said dog to move out of said propulsion position, said trolley body being provided with a transverse member guiding the upper end of said rod in said movement of the latter, said member internally receiving the upper end of said rod.

21. A traveling load supporting and accumulation unit, comprising a pair of side members providing a trolley body having a dog pivotally mounted thereon and adapted to be engaged by trolley propulsion means to propel said body, forward and rearward track wheels on said trolley body, a load member carried by said trolley body in depending relation thereto, and an accumulation mechanism mounted on said load member, including a control rod movably mounted on said load member to act upwardly on a line passing between the axes of said forward and rearward wheels and between said side members of said body, said rod engaging and normally sustaining said dog in a position for propulsion by said propulsion means, and means actuated by contact with another object to cause said rod to move to a position in which it permits said dog to move out of said propulsion position, said trolley body being provided with a transverse members guiding the upper end of said rod in said movement of the latter, said member being externally straddled by the upper end of said rod.

22. A traveling load supporting and accumulation unit, comprising a pair of side members providing a trolley body having a dog pivotally mounted thereon and adapted to be engaged by trolley propulsion means to propel said body, forward and rearward track wheels on said trolley body, a load member carried by said trolley body in depending relation thereto, and an accumulation mechanism mounted on said load member, including a control rod movably mounted on said load member to act upwardly on a line passing between the axes of said forward and rearward wheels and between said side members of said body, said rod engaging and normally sustaining said dog in a position for propulsion by said propulsion means, and means actuated by contact with another object to cause said rod to move to a position in which it permits said dog to move out of said propulsion position, said dog being pivoted on said trolley body for said last named movement with a component in the direction of the propulsion, said trolley body being provided with a transverse member guiding the upper end of said rod in said movement of the latter.

23. A traveling load supporting and accumulation unit, comprising a pair of side members providing a trolley body having a dog pivotally mounted thereon and adapted to be engaged by trolley propulsion means to propel said body, forward and rearward track wheels on said trolley body, a load member carried by said trolley body in depending relation thereto, and an accumulation mechanism mounted on said load member, including a control rod movably mounted on said load member to act upwardly on a line passing between the axes of said forward and rearward wheels and between said side members of said body, said rod engaging and normally sustaining said dog in a position for propulsion by said propulsion means, and means actuated by contact with another object to cause said rod to move to a position in which it permits said dog to move out of said propulsion position, said trolley body having transverse forward and rearward rollers guiding said control rod adjacent the lower end of the latter.

24. A traveling load supporting and accumulation unit, comprising a pair of side members providing a trolley body having a dog pivotally mounted thereon and adapted to be engaged by trolley propulsion means to propel said body, forward and rearward track wheels on said trolley body, load means including a load member carried by said trolley body in depending relation thereto, and an accumulation mechanism mounted on said load member, including a control rod movably mounted on said load member to act upwardly on a line passing between the axes of said forward and rearward wheels and between said side members of said body, said rod engaging and normally sustaining said dog in a position for propulsion by said propulsion means, and means actuated by contact with another object to cause said rod to move to a position in which it permits said dog to move out of said propulsion position, said load means further including a member secured on said trolley body beneath the latter and provided with a horizontally elongated, upwardly concave guide way, said load member having a suspension roller journaled on the top thereof and received for movement on said guideway.

25. A traveling load supporting and accumulation unit, comprising a pair of side members providing a trolley body having a dog pivotally mounted thereon and adapted to be engaged by trolley propulsion means to propel said body, forward and rearward track wheels on said trolley body, load means including a load member carried by said trolley body in depending relation thereto, and an accumulation mechanism mounted on said load member, including a control rod movably mounted on said load member to act upwardly on a line passing between the axes of said forward and rearward wheels and between said side members of said body, said rod engaging and normally sustaining said dog in a position for propulsion by said propulsion means, and means actuated by contact with another object to cause said rod to move to a position in which it permits said dog to move out of said propulsion position, said trolley body having transverse forward and rearward rollers guiding said control rod adjacent the lower end of the latter, said load means further including a member secured on said trolley body beneath the latter and provided with a horizontally elongated, upwardly concave guide way, said load member having a suspension roller journaled on the top thereof and received for movement on said guideway.

26. A track trolley comprising a trolley body having wheel means to roll on a track, a trolley dog pivotally mounted on said trolley body, said dog extending from the pivot thereof forwardly of the trolley body, terminating forwardly in a rearwardly facing portion engageable by propulsion means to advance said trolley forwardly, said trolley dog being swingable about its pivot out of position for engagement by said propulsion means in a movement having a forward component in the direction of movement of said propulsion means.

27. A track trolley comprising a trolley body having wheel means to roll on a track, forward and rearward trolley dogs pivotally mounted on said trolley body, said dogs extending from the pivot thereof forwardly of the trolley body, the forward dog terminating forwardly in a rearwardly facing portion engageable by propulsion means to advance said trolley forwardly, said forward trolley dog being swingable about its pivot out of position for engagement by said propulsion means in a movement having a forward component in the direction of movement of said propulsion means.

28. A track trolley comprising a trolley body having wheel means to roll on a track, forward and rearward trolley dogs pivotally mounted on said trolley body, said dogs each having the pivot thereof disposed on the same side of the longitudinal center line of said trolley extending from the pivot thereof forwardly of the trolley body, the forward dog terminating forwardly in a rearwardly facing portion engageable by propulsion means to advance said trolley forwardly, said forward trolley dog being swingable about its pivot out of position for engagement by said propulsion means in a movement having a forward component in the direction of movement of said propulsion means.

29. A track trolley comprising a trolley body having wheel means to roll on a track, including wheels mounted on forwardly and rearwardly spaced axes, forward and rearward trolley dogs pivotally mounted on said trolley body, said dogs each having the pivot thereof disposed on the same side of the longitudinal center line of said trolley and adjacent the axis of the rear wheel, and extending from the pivot thereof forwardly of the trolley body, the forward dog terminating forwardly in a rearwardly facing portion engageable by propulsion means to advance said trolley forwardly, said forward trolley dog being swingable about its pivot out of position for engagement by said propulsion means in a movement having a forward component in the direction of movement of said propulsion means.

30. A track trolley comprising a trolley body having wheel means, a trolley dog pivotally mounted on said trolley body, said dog extending from the pivot thereof forwardly of the trolley body, terminating forwardly in a rearwardly facing portion engageable by propulsion means to advance said trolley forwardly, said trolley dog being swingable about its pivot out of position for engagement by said propulsion means in a movement having a forward component in the direction of movement of said propulsion means, and releasable means normally maintaining said forward dog in said position for engagemet.

31. A track trolley comprising a trolley body having wheel means, forward and rearward trolley dogs pivotally mounted on said trolley body, said dogs each having the pivot thereof disposed to the rear of the longitudinal center line of said trolley body and extending from the pivot thereof forwardly of the trolley body, the forward dog terminating forwardly in a rearwardly facing portion engageable by propulsion means to advance said trolley forwardly, said forward trolley dog being swingable about its pivot out of position for engagement by said propulsion means in a movement having a forward component in the direction of movement of said propulsion means, and releasable means normally maintaining said forward dog in said position for engagement.

32. A track trolley comprising a trolley body having wheel means, forward and rearward trolley dogs pivotally mounted on said trolley body, said dogs each having the pivot thereof disposed to the rear of the longitudinal center line of said trolley body and extending from the pivot thereof forwardly of the trolley body, the forward dog terminating forwardly in a rearwardly facing portion engageable by propulsion means to advance said trolley forwardly, said forward trolley dog being swingable about its pivot out of position for engagement by said propulsion means in a movement having a forward component in the direction of movement of said propulsion means, and releasable means normally maintaining said forward dog in said position for engagement, including a control rod acting on said forward dog on a line substantially through said longitudinal center line of the trolley.

33. A track trolley comprising a trolley body having wheel means, forward and rearward trolley dogs pivotally mounted on said trolley body, said dogs each having the pivot thereof disposed to the rear of the longitudinal center line of said trolley body and extending from the pivot thereof forwardly of the trolley body, the forward dog terminating forwardly in a rearwardly facing portion engageable by propulsion means to advance said trolley forwardly, said forward trolley dog being swingable about its pivot out of position for engagement by said propulsion means in a movement having a forward component in the direction of movement of said propulsion means, and releasable means normally maintaining said forward dog in said position for engagement between the pivot thereof and said terminal portion thereof.

34. A track trolley comprising a trolley body having wheel means, forward and rearward trolley dogs pivotally mounted on said trolley body, said dogs each having the pivot thereof disposed to the rear of the longitudinal center line of said trolley body and extending from the pivot thereof forwardly of the trolley body, the forward dog terminating forwardly in a rearwardly facing portion engageable by propulsion means to advance said trolley forwardly, said forward trolley dog being swingable about its pivot out of position for engagement by said propulsion means in a movement having a forward component in the direction of movement of said propulsion means, and releasable means normally maintaining said forward dog in said position for engagement, including a control rod acting on said forward dog between the pivot thereof and said terminal portion thereof and on a line substantially through said longitudinal center line of the trolley.

35. The combination of a track trolley, a load bearing member, a suspension of said member from said trolley, comprising means providing a swivel connection of said member to said trolley on an upright swivel axis and a control element for said trolley having means mounting the same for vertical movement relative to the trolley substantially along said axis, said trolley having propulsion means operatively connected to and controlled by said control element in accordance with the position of the latter.

36. The combination of a track trolley having a horizontally journaled load roller, a load bearing member, a suspension of said member from said trolley, comprising means providing a swivel connection of said member to said trolley on an upright swivel axis substantially intersecting the horizontal axis of said trolley load roller and a control element for said trolley having means mounting the same for vertical movement relative to the trolley substantially along said axis, said trolley having propulsion means operatively connected to and controlled by said control element in accordance with the position of the latter.

37. The combination of a track trolley, a load bearing member, a suspension of said member from said trolley, comprising means providing a swivel connection of said member to said trolley on an upright swivel axis, and means to provide a universal joint between said member and body at the swivel axis permitting relative vertical rocking of the two and a control element for said trolley having means mounting the same for vertical movement relative to the trolley substantially along said axis, said trolley having propulsion means operatively connected to and controlled by said control element in accordance with the position of the latter.

38. The combination of a track trolley having a horizontally journaled load roller, a load bearing member, a suspension of said member from said trolley, comprising means providing a swivel connection of said member to said trolley on an upright swivel axis substantially intersecting the horizontal axis of said trolley load roller, and means to provide a universal joint between said member and body at the swivel axis permitting relative vertical rocking of the two, said member and trolley being in predetermined and sufficiently close vertical relation to one another at one side of said swivel axis to engage and limit said rocking and a control element for said trolley having means mounting the same for vertical movement relative to the trolley substantially along said axis, said trolley having propulsion means operatively connected to and controlled by said control element in accordance with the position of the latter.

39. The combination of a track trolley, a load bearing member, a suspension of said member from said trolley, comprising means providing a swivel connection of said member to said trolley on an upright swivel axis, and anti-friction means on a side of said swivel connection engaging between said trolley and load bearing member to limit relative vertical rocking of the same at said swivel axis and a control element for said trolley having means mounting the same for vertical movement relative to the trolley substantially along said axis, said trolley having propulsion means operatively connected to and controlled by said control element in accordance with the position of the latter.

40. The combination of a track trolley having a horizontally journalled load roller, a load bearing member, a suspension of said member from said trolley, comprising means providing a swivel connection of said member to said trolley on an upright swivel axis substantially intersecting the horizontal axis of said trolley load roller, and anti-friction means on a side of said swivel connection engaging between said trolley and load bearing member to limit relative vertical rocking of the same at said swivel axis and a control element for said trolley having means mounting the same for vertical movement relative to the trolley substantially along said axis, said trolley having propulsion means operatively connected to and controlled by said control element in accordance with the position of the latter.

41. The combination of a track trolley, a load bearing member, a suspension of said member from said trolley, comprising means providing a swivel connection of said member to said trolley on an upright swivel axis, and anti-friction means on a side of said swivel connection engaging between said trolley and load bearing member to limit relative vertical rocking of the same at said swivel axis, said load bearing member comprising a body of inverted U-shaped cross section providing a transverse upwardly facing surface slidingly engageable by said anti-friction means and a control element for said trolley having means mounting the same for vertical movement relative to the trolley substantially along said axis, said trolley having propulsion means operatively connected to and controlled by said control element in accordance with the position of the latter.

42. The combination of a track trolley, a load bearing member, a suspension of said member from said trolley, comprising means providing a swivel connection of said member to said trolley on an upright swivel axis, and anti-friction means on both sides of said swivel connection engaging between said trolley and load bearing member to limit relative vertical rocking of the same at said swivel axis and a control element for said trolley having means mounting the same for vertical movement relative to the trolley substantially along said axis, said trolley having propulsion means operatively connected to and controlled by said control element in accordance with the position of the latter.

43. A traveling load supporting and accumulation unit comprising a trolley having longitudinally spaced dogs pivotally mounted thereon and presenting portions adapted to be engaged by trolley propulsion means, a load member carried by said trolley, and an accumulation control mechanism mounted on said load member for actuation by a longitudinally fixed stop member and by a like load member preceding the same, said mechanism including a control element movably mounted on said load member to act on a line passing between said dog portions and normally sustaining one of said dogs in a position for propulsion by said propulsion means, and first and second means actuated respectively by contact with said stop member or with said preceding load member to cause said control element to move out of said position to sustain said dog in said propulsion position.

44. A load supporting and accumulation unit in accordance with claim 43, in which said last named dog is mounted on said trolley for pivotal movement out of said propulsion position with a component in the direction of movement of the propulsion means.

45. A load supporting and accumulation unit in accordance with claim 43, in which said accumulation control mechanism on said load member comprises a cam mounted on the latter for movement into and out of position to hold said control element in the normal, dog-sustaining position of the latter, a shaft so mounting said control element for movement, and an actuating arm on said shaft positioned for engagement with said stop member to halt said load member and trolley, and to move said shaft and cam out of position to hold said control element in normal, dog-sustaining position.

46. A load accumulation apparatus, comprising longitudinally extending track means, a trolley supported by said means for movement therealong and having longitudinally spaced dogs pivotally mounted thereon and presenting portions adapted to be engaged by trolley propulsion means paralleling said track means, a stop member mounted adjacent said track means for movement relative to the latter into and out of trolley halting position, a load member carried by said trolley, and an accumulation control mechanism mounted on said load member for actuation by said stop member and by a like load member preceding the same, said mechanism including a control element movably mounted on said load member to act on a line passing between said dog portions and normally sustaining one of said dogs in a position for propulsion by said propulsion means, and first and second means actuated respectively by contact with said stop member or with said preceding load member to cause said control element to move out of said position to sustain said dog in said propulsion position.

47. A load accumulation apparatus in accordance with claim 46, in which said last named dog is mounted on said trolley for pivotal movement out of said propulsion position with a component in the direction of the propulsion.

48. A load accumulation apparatus in accordance with claim 46, in which said accumulation control mechanism on said load member comprises a cam mounted on the latter for movement into and out of position to hold said control element in the normal, dog-sustaining position of the latter, a shaft so mounting said control element for movement, and an actuating arm on said shaft positioned for engagement with said stop member to halt said load member and trolley, and to move said shaft and cam out of position to hold said control element in normal, dog-sustaining position.

49. A traveling load supporting and accumulation unit comprising a trolley having longitudinally spaced track rollers and a dog movably mounted thereon and adapted to be engaged by trolley propulsion means, a load member swiveled on said trolley on a swivel axis extending vertically between said track rollers, and an accumulation control mechanism mounted on said load member for actuation by a load member preceding the same, said mechanism including a control element movably mounted on said load member to act on a line substantially coinciding with said swivel axis, said control element normally sustaining said dog in a position for propulsion by said propulsion means, and means actuated by contact with said preceding load member to cause said control element to move out of said position to sustain said dog in said propulsion position.

50. A traveling load supporting and accumulation unit comprising a trolley having track rollers and a dog movably mounted thereon and adapted to be engaged by trolley propulsion means, a load member on said trolley, and an accumulation control mechanism mounted on said load member for selective actuation by a stop member and by a load member preceding the same, said mechanism including a control element movably mounted on said load member, said control element normally sustaining said dog in a position for propulsion by said propulsion means, and means including first and second means actuated respectively by contact with said stop member or with said preceding load member to cause said control element to move out of said position to sustain said dog in said propulsion position.

51. A traveling load supporting and accumulation unit comprising a trolley having longitudinally spaced track rollers and a dog movably mounted thereon and adapted to be engaged by trolley propulsion means, a load member swiveled on said trolley on a swivel axis extending vertically between said track rollers, and an accumulation control mechanism mounted on said load member for selective actuation by a stop member and by a load member preceding the same, said mechanism including a control element movably mounted on said load member to act on a line substantially coinciding with said swivel axis, said control element normally sustaining said dog in a position for propulsion by said propulsion means, and means including first and second means actuated respectively by contact with said stop member or with said preceding load member to cause said control element to move out of said position to sustain said dog in said propulsion position.

52. A traveling load supporting and accumulation unit comprising a trolley having track rollers and a dog movably mounted thereon and adapted to be engaged by trolley propulsion means, a load member on said trolley, and an accumulation control mechanism mounted on said load member for actuation by a load member preceding the same, said mechanism including a control element movably mounted on said load member, said control element normally sustaining said dog in a position for propulsion by said propulsion means, and means actuated by contact with said preceding load member to cause said control element to move out of said position to sustain said dog in said propulsion position, said last named means comprising a bumper member mounted on said load member for movement in response to said contact, and means providing a delayed action operating connection between said bumper member and said control element to cause the latter to sustain said dog in said propulsion position for a predetermined short time interval after said contact.

53. A traveling load supporting and accumulation unit comprising a trolley having longitudinally spaced track rollers and a dog movably mounted thereon and adapted to be engaged by trolley propulsion means, a load member swiveled on said trolley on a swivel axis extending vertically between said track rollers, and an accumulation control mechanism mounted on said load member for actuation by a load member preceding the same, said mechanism including a control element movably mounted on said load member to act on a line substantially coinciding with said swivel axis, said control element normally sustaining said dog in a position for propulsion by said propulsion means, and means actuated by contact with said preceding load member to cause said control element to move out of said position to sustain said dog in said propulsion position, said last named means comprising a bumper member mounted on said load member for movement in response to said contact, and means providing a delayed action operating connection between said bumper member and said control element to cause the latter to sustain said dog in said propulsion position for a predetermined short time interval after said contact.

54. A traveling load supporting and accumulation unit comprising a trolley having track rollers and a dog movably mounted thereon and adapted to be engaged by trolley propulsion means, a load member on said trolley, and an accumulation control mechanism mounted on said load member for actuation by a load member preceding the same, said mechanism including a control element movably mounted on said load member, said control element normally sustaining said dog in a position for propulsion by said propulsion means, and means actuated by contact with said preceding load member to cause said control element to move out of said position to sustain said dog in said propulsion position, said last named means comprising a bumper member movably mounted on said load member adjacent the front thereof and provided with a latch element, a linkage operatively connecting said bumper member with said control element to control the position of the latter, and further latch element on said load member adjacent the rear thereof for anti-rebound latching engagement with said first named latch elements of a like following unit.

55. A traveling load supporting and accumulation unit comprising a trolley having track rollers and a dog movably mounted thereon and adapted to be engaged by trolley propulsion means, a load member on said trolley, and an accumulation control mechanism mounted on said load member for actuation by a load member preceding the same, said mechanism including a control element movably mounted on said load member, said control element normally sustaining said dog in a position for propulsion by said propulsion means, and means actuated by contact with said preceding load member to cause said control element to move out of said position to sustain said dog in said propulsion position, said last named means comprising a bumper member movably mounted on said load member adjacent the front thereof and provided with a latch element, a lost motion linkage operatively connecting said bumper member with said control element to control the position of the latter, a further latch element movably mounted on said load member adjacent the rear thereof for anti-rebound latching engagement with said first named latch element of a like following unit, and operatively connecting said further latch element with said linkage for conjoint operation therewith.

56. A traveling load supporting and accumulation unit comprising a trolley having a dog movably mounted thereon and adapted to be engaged by trolley propulsion means, means releasably sustaining said dog in position for said propulsion under said engagement, a load member carried by said trolley, and an accumulation control mechanism for actuation by a load member preceding the same and actuable by engagement with the preceding load member to cause said sustaining means to release said dog for movement out of said propulsion position, and means providing a lost motion operating connection between said bumper and said sustaining means to so release said dog after a predetermined short time interval following last named engagement, said mechanism including a bumper element movably mounted on said load member adjacent the front thereof between said dog portions and normally sustaining one of said dogs in a position for propulsion by said propulsion means, and first and second means actuated respectively by contact with said stop member or with said preceding load member to cause said control element to move out of said position to sustain said dog in said propulsion position.

57. In combination with a driving conveyor for moving a plurality of work carriers along a predetermined path, mechanism which comprises a pivoted dog on one of the carriers engageable by the conveyor for connecting the carrier to the conveyor, an operating member for pivoting said dog, first cam means for moving said operating member, resilient means urging said first cam means toward a position in which said operating member holds said dog in a position in which it can be engaged by the conveyor, movable bumper means on the one carrier for moving said first cam means, second cam means on a preceding carrier which is adjacent the one carrier, said bumper means being engageable with said second cam means on the adjacent preceding carrier when the adjacent preceding carrier is substantially fixed against movement, and said second cam means on the adjacent preceding carrier being operative to move said bumper means and said first cam means against the action of said resilient means to release said operating member so that said pivoted dog pivots to release the one carrier from the conveyor.

58. In combination with a driving conveyor for moving a plurality of work carriers along a predetermined path, mechanism which comprises a pivoted dog on one of the carriers engageable by the conveyor for connecting the carrier to the conveyor, said pivoted dog being pivotable in the direction of movement of the conveyor to release the carrier from the conveyor, an operating member for pivoting said dog, first cam means for moving said operating member, means urging said first cam means toward a position in which said operating member holds said dog in a position in which it can be engaged by the conveyor, movable bumper means on the one carrier for moving said first cam means, second cam means on a preceding carrier which is adjacent the one carrier, said bumper means being engageable with said second cam means on the adjacent preceding carrier when the adjacent preceding carrier is substantially fixed against movement, and said second cam means on the adjacent preceding carrier being operative to move said bumper means and said first cam means against the action of said urging means to release said operating member so that said pivoted dog pivots to release the one carrier from the conveyor.

59. The combination of a track trolley, a load bearing member, a suspension of said member from said trolley, comprising means providing a swivel connection of said member to said trolley on an upright swivel axis, and a control element for said trolley having means mounting the same for vertical movement relative to the trolley substantially along said axis, said trolley having propulsion means operatively connected to and controlled by said control element in accordance with the position of the latter, said load bearing member having bumper means mounted for movement thereon in response to engagement with another object in the travel of the trolley and load bearing member, said bumper means being operatively connected to said control element to control the position of the latter in response to engagement of said bumper means with said other object.

60. The combination in accordance with claim 59, in which said bumper means includes a movable bumper operatively connected to said control element through the agency of a cam operatively connected to said bumper and acting upon said control element to control the position of the latter.

References Cited by the Examiner

UNITED STATES PATENTS

| | | | |
|---|---|---|---|
| 1,445,893 | 2/23 | Krump | 105—154 |
| 1,573,778 | 2/26 | Beaumont | 105—154 |
| 2,038,824 | 4/36 | Byrnes | 105—150 |
| 2,485,215 | 10/49 | Rose | 105—155 |
| 2,581,948 | 1/52 | Flounders | 105—150 |
| 2,621,609 | 12/52 | McCaul et al. | 104—172 |
| 2,645,187 | 7/53 | Gaudagna | 105—154 |
| 2,883,942 | 4/59 | Johnson | 104—172 |
| 2,943,581 | 7/60 | Bendik | 105—150 |
| 2,956,514 | 10/60 | Bishop | 104—172 X |

EUGENE G. BOTZ, *Primary Examiner.*

JAMES S. SHANK, LEO QUACKENBUSH, NELSON M. ELLISON, *Examiners.*